US009927687B2

(12) United States Patent
Maruyama

(10) Patent No.: US 9,927,687 B2
(45) Date of Patent: Mar. 27, 2018

(54) LIGHT SOURCE UNIT AND PROJECTOR INCLUDING THE SAME

(71) Applicant: PANASONIC INTELLECTUAL PROPERTY MANAGEMENT CO., LTD., Osaka (JP)

(72) Inventor: Kenji Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 14/616,835

(22) Filed: Feb. 9, 2015

(65) Prior Publication Data

US 2015/0253656 A1    Sep. 10, 2015

(30) Foreign Application Priority Data

Mar. 10, 2014 (JP) ................... 2014-046256

(51) Int. Cl.
    *G03B 21/20* (2006.01)
    *F21V 7/04* (2006.01)

(52) U.S. Cl.
    CPC ............ *G03B 21/2066* (2013.01); *F21V 7/04* (2013.01); *G03B 21/2026* (2013.01)

(58) Field of Classification Search
    CPC .. G03B 21/2066; G03B 21/16; G03B 21/006; G03B 21/2026; G03B 21/00; G03B 21/20; F21V 7/04
    (Continued)

(56) References Cited

U.S. PATENT DOCUMENTS

| 7,758,213 B2 | 7/2010 | Goto et al. |
| 2003/0086271 A1 | 5/2003 | Masuoka et al. |

(Continued)

FOREIGN PATENT DOCUMENTS

| CN | 101430996 | 5/2009 |
| CN | 102667329 | 9/2012 |

(Continued)

OTHER PUBLICATIONS

Chinese Office Action dated May 4, 2016, including search report, issued in corresponding Chinese Patent Application No. 201510079464.0 and English translation thereof.

(Continued)

*Primary Examiner* — Steven H Whitesell Gordon
*Assistant Examiner* — Jerry Brooks
(74) *Attorney, Agent, or Firm* — Greenblum & Bernstein, P.L.C.

(57) ABSTRACT

In a light source unit, a high-pressure discharge lamp includes a first and a second external electrode to emit light as electric power is supplied thereto through a first and a second power supply line, a concave reflection mirror, which reflects the light, has an opening at the center thereof to pass one end of the high-pressure discharge lamp therethrough, and a base holding the one end of the high-pressure discharge lamp to allow the first power supply line to be connected to the first external electrode. Further, there are a reinforcing member covering at least a part of a rear surface of the concave reflection mirror, and a restraint member being held between the rear surface and the reinforcing member to restrain a movable range of the second power supply line. The restraint member makes contact with a part of the second power supply line.

18 Claims, 19 Drawing Sheets

(58) Field of Classification Search
USPC ........................................ 353/98; 362/296.07
See application file for complete search history.

(56) References Cited

U.S. PATENT DOCUMENTS

| | | | | |
|---|---|---|---|---|
| 2004/0264200 | A1* | 12/2004 | Hirano | .................... C03B 11/10 |
| | | | | 362/341 |
| 2006/0126333 | A1 | 6/2006 | Goto et al. | |
| 2008/0049346 | A1* | 2/2008 | Cusick | ................. G02B 26/008 |
| | | | | 359/891 |
| 2009/0066209 | A1* | 3/2009 | Imamura | .................. H01J 5/48 |
| | | | | 313/113 |
| 2009/0121602 | A1 | 5/2009 | Miwata et al. | |
| 2011/0074273 | A1* | 3/2011 | Kroell | ....................... H01J 5/54 |
| | | | | 313/113 |
| 2013/0010267 | A1* | 1/2013 | Tanaka | .................. G03B 21/16 |
| | | | | 353/52 |
| 2013/0141919 | A1 | 6/2013 | Hendriks | |

FOREIGN PATENT DOCUMENTS

| | | |
|---|---|---|
| JP | 2003-208801 | 7/2003 |
| JP | 2006-172810 | 6/2006 |
| JP | 2009-117284 | 5/2009 |
| JP | 2013-512543 | 4/2013 |

OTHER PUBLICATIONS

Japanese Official Action with English-language summary for JP Pat. App. No. 2014-046256 dated Jun. 10, 2015.

* cited by examiner

LIGHT SOURCE UNIT AND PROJECTOR INCLUDING THE SAME

CROSS-REFERENCE TO RELATED APPLICATIONS

This application claims priority to Japanese Patent Application No. 2014-046256 filed on Mar. 10, 2014, the entire contents of which are incorporated herein by reference.

TECHNICAL FIELD

The present disclosure relates to a light source unit which includes a high-pressure discharge lamp and a concave reflection mirror, and a projector including the light source unit.

BACKGROUND ART

In general, a light source unit for a projector includes a high-pressure discharge lamp and a concave reflection mirror. The concave reflection mirror includes a concave reflection surface and a tubular holding portion formed at the bottom side of the reflection surface. Japanese Unexamined Patent Application Publication No. 2006-172810 (JP2006-172810A) discloses a configuration in which a ceramic-made base member is disposed at the rear surface side of a holding portion of a concave reflection mirror and in which one end of a high-pressure discharge lamp is held by the base member.

In the conventional light source unit, the high-pressure discharge lamp includes a pair of external electrodes (external leads). One of the external electrodes positioned at the front surface side of the concave reflection mirror is connected to a power supply line through a through-hole formed in the concave reflection mirror. If an external force is applied to the power supply line, an unnecessary force is exerted on the high-pressure discharge lamp. This may pose a problem in that the high-pressure discharge lamp is tilted and the light emitting point is shifted away from a center axis of the concave reflection mirror.

In order to avoid this problem, it is necessary to fix a ring-shaped terminal to the through-hole of the concave reflection mirror by means of, e.g., a grommet member, and to fix the power supply line to the ring-shaped terminal by welding, fitting, caulking or the like. However, this step makes a manufacturing process complex.

SUMMARY OF THE INVENTION

In accordance with an aspect of the present disclosure, there is provided a light source unit, including: a high-pressure discharge lamp including a first external electrode and a second external electrode at the opposite ends thereof and configured to emit light as electric power is supplied to the first external electrode and the second external electrode through a first power supply line and a second power supply line, respectively; a concave reflection mirror, which has an opening formed at the center thereof to pass one end of the opposite ends of the high-pressure discharge lamp therethrough and is configured to reflect the light emitted from the high-pressure discharge lamp; a base configured to hold the one end of the opposite ends of the high-pressure discharge lamp to allow the first power supply line to be connected to the first external electrode; a reinforcing member covering at least a part of a rear surface of the concave reflection mirror; and a restraint member, which is held between the rear surface of the concave reflection mirror and the reinforcing member to restrain a movable range of the second power supply line. The restraint member makes contact with a part of the second power supply line.

With the light source unit of the present disclosure, the movable range of the power supply line connected to one of the external electrodes of the high-pressure discharge lamp positioned at the front surface side of the concave reflection mirror is appropriately restrained by a "restraint member", which is provided on the rear surface of the concave reflection mirror. Therefore, even if an external force is applied to the power supply line, the unnecessary force applied to the high-pressure discharge lamp is reduced. Thus, the position shift of the high-pressure discharge lamp is hard to occur.

Furthermore, the light source unit of the present disclosure includes the reinforcing member installed at the rear surface side of the concave reflection mirror. Therefore, the strength of the concave reflection mirror becomes higher. Thus, the concave reflection mirror can be made of a material which is relatively low in strength. In addition, even when the high-pressure discharge lamp is broken, it is possible to prevent the concave reflection mirror from being broken and to prevent the fragments of the broken concave reflection mirror from scattering outward.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1A:
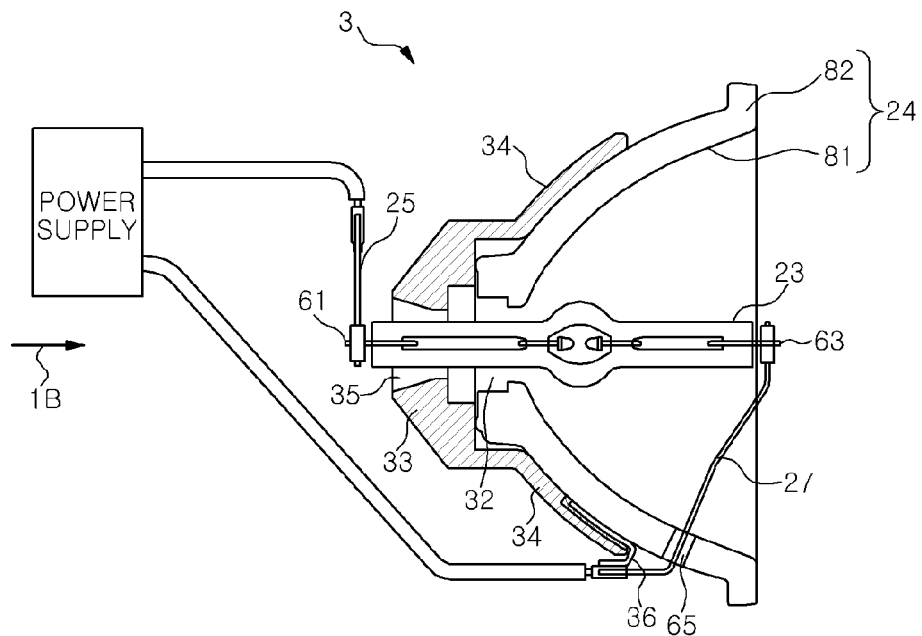
FIG. 1A is a schematic sectional view showing a configuration example of a light source unit in accordance with an embodiment of the present disclosure.

The knowledge which forms a basis of the present disclosure will be described prior to describing the embodiment of the present disclosure.

The temperature (lamp temperature) of a high-pressure discharge lamp (hereinafter, often simply referred to as a "lamp") may reach, e.g., 1000° C., during the operation thereof. The "high-pressure discharge lamp" is also called a high intensity discharge Lamp (HID). The high-pressure discharge lamp includes a metal halide lamp, a high-pressure sodium lamp, an extra-high-pressure mercury lamp, and so forth. During the operation, the pressure in a light emitting tube (hereinafter, referred to as a light emitting unit) of the high-pressure discharge lamp may have a large value ranging from several atm to more than 100 atm, depending on the type of the high-pressure discharge lamp.

In case where the high-pressure discharge lamp is used in combination with a concave reflection mirror (hereinafter often simply referred to as a "reflection mirror"), the reflection mirror as well as the high-pressure discharge lamp needs to be made of a material that can endure a high temperature. The reflection mirror of the light source unit receives heat from the high-pressure discharge lamp having high temperature by virtue of radiation, conduction and air convection. During the operation, the temperature of the reflection mirror is increased to several hundred ° C. and is highest in a region near the light emitting unit of the high-pressure discharge lamp. When the high-pressure discharge lamp is turned off, the temperature of the reflection mirror heated to a high temperature during the operation decreases to a level of room temperature. In order to endure such a temperature change, the reflection mirror is preferably be made of crystallized glass having superior strength and heat resistance. However, the crystallized glass is relatively expensive and is a main factor in increasing the manufacturing cost.

According to the study conducted by the present inventor, if a reinforcing member is installed at the rear surface side of the reflection mirror, it becomes possible to form the reflection mirror using a material, which is lower in strength than crystallized glass, e.g., aluminum silicate glass (aluminosilicate glass) or borosilicate glass. This makes it possible to prevent the reflection mirror from being broken and to prevent the fragments of the broken reflection mirror from scattering outward, while reducing the manufacturing cost.

The present disclosure relates to a light source unit including the reinforcing member installed at the rear surface side of the reflection mirror and a projector including the light source unit. The present disclosure provides a novel configuration in which the power supply line connected to one of the external electrodes of the high-pressure discharge lamp positioned at the front surface side of the concave reflection mirror can be easily fixed to the reflection mirror.

An overview of the light source unit of the present disclosure will now be described prior to describing a specific embodiment.

Overview of Light Source Unit

FIG. 1A is a sectional view showing a configuration example of a light source unit 3 in accordance with an embodiment of the present disclosure. In FIG. 1A, only the major component elements of the light source unit 3 are shown and the details are omitted. In FIG. 1A, there are also shown wiring lines 25 and 27 through which electric power is supplied to the light source unit 3.

The light source unit 3 includes a high-pressure discharge lamp 23 having a first external electrode 61 and a second external electrode 63 which are disposed at the opposite ends of the lamp 23, and a concave reflection mirror 24 configured to reflect the light emitted from the lamp 23. The high-pressure discharge lamp 23 may be, e.g., an extra-high-pressure mercury lamp or a metal halide lamp. The light source unit 3 is connected to a power supply through a pair of power supply lines (lead wires) 25 and 27, which are respectively connected to the external electrodes 61 and 63 disposed at the opposite ends of the lamp 23. The reflection mirror 24 includes a base material 82 having a concave surface shape, and a reflection surface 81 formed on the base material 82 at the front surface side (inner side) of the reflection mirror 24. The reflection mirror 24 further includes an opening 32, which is formed at the center thereof and is configured to accommodate one end of the lamp 23; and a through-hole 65, which is formed in a part of the side surface of the reflection mirror 24 and is configured to allow the second power supply line 27 to extend therethrough.

The light source unit 3 further includes a base 33 configured to hold one end of the lamp 23, a reinforcing member 34 configured to cover at least a part of the rear surface of the reflection mirror 24, and a restraint member 36 held between the rear surface of the reflection mirror 24 and the reinforcing member 34. The restraint member 36 is configured to restrain the movable range (movable zone) of the second power supply line 27.

The base 33 has a tubular structure and includes an opening 35 through which one end of the lamp 23 extends such that the first power supply line 25 can be connected to the first external electrode 61. The reinforcing member 34 is connected to the base 33 and is formed so as to cover the rear surface of the reflection mirror 24. In the example shown in FIG. 1A, the reinforcing member 34 and the base 33 are made of the same material and are one-piece formed with each other. Alternatively, the reinforcing member 34 and the base 33 may be separated from each other and may be made of different materials.

Figure 1B:
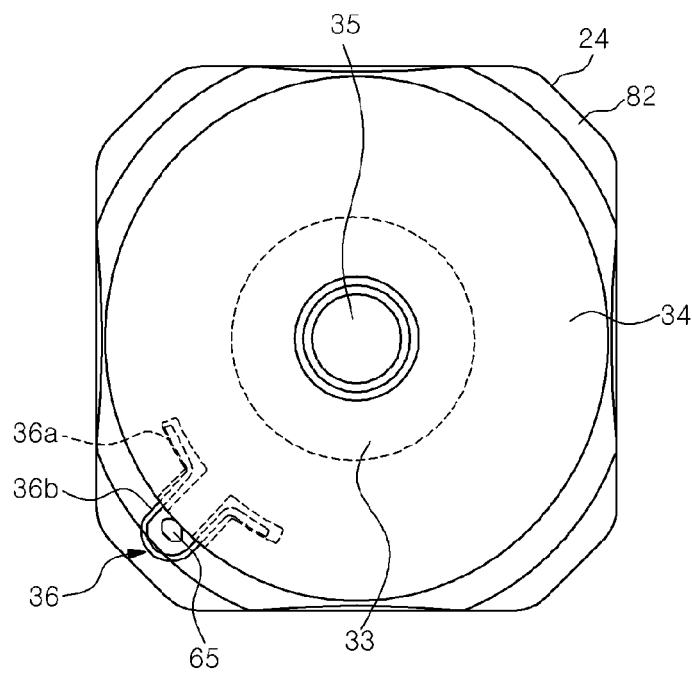
FIG. 1B is an outward appearance view of the light source unit shown in FIG. 1A, which is seen from the rear surface side (in the direction indicated by an arrow 1B of FIG. 1A).

FIG. 1B is an outward appearance view of the light source unit 3 shown in FIG. 1A, which is seen from the rear surface side (in the direction indicated by an arrow 1B of FIG. 1A). In FIG. 1B, the lamp 23 and the power supply lines 25 and 27 are not shown for the sake of clarity. In FIG. 1B, the portion hidden by the reinforcing member 34 is indicated by a broken line. When seen from the rear surface side of the reflection mirror 24 (i.e., when seen from one end of the lamp 23 passing through the opening 32), the reinforcing member 34 surrounds the periphery of the base 33 in a band-shape and is bonded to the rear surface of the reflection mirror 24. The restraint member 36 partially protrudes outward so as to make contact with the part of the second power supply line 27 led out from the rear surface of the reflection mirror 24 through the through-hole 65. In a certain embodiment, the restraint member 36 serves as a connection terminal or a fixing element with respect to the second power supply line 27.

More specifically, the restraint member 36 in this example is a line-shaped member that includes first line-shaped portions (broken-line portions in FIG. 1B) 36a positioned in a gap between the rear surface of the reflection mirror 24 and the reinforcing member 34 and a second line-shaped portion (solid-line portion in FIG. 1B) 36b positioned outside of the gap between the rear surface of the reflection mirror 24 and the reinforcing member 34. The restraint member 36 in this example is formed by bending one metal wire. The opposite ends of the second line-shaped portion 36b are connected to the first line-shaped portions 36a. The second line-shaped portion 36b can be fixed to the second power supply line 27 by, e.g., welding, fitting, caulking or the like. Alternatively, the restraint member 36 and the second power supply line 27 need not be fixed to each other. For example, the movable range of the second power supply line 27 may be restrained by a friction force.

As will be described in detail later, the shape, size and number of the restraint member 36 is not limited to the example shown in FIGS. 1A and 1B but may be variously modified. The function required in the restraint member 36 is to sufficiently suppress the application of an external force to the second external electrode 63 through the second power supply line 27 when or after the second power supply line 27 is connected to the second external electrode 63, thereby preventing the position shift and breakage of the lamp 23. As long as the restraint member 36 is configured to have the aforementioned function, the shape, size and number of the restraint member 36 is not limited to specific one.

Next, one example of a step of assembling the light source unit 3 by combining the respective parts will be described with reference to FIGS. 2A to 2D.

Figure 2A:
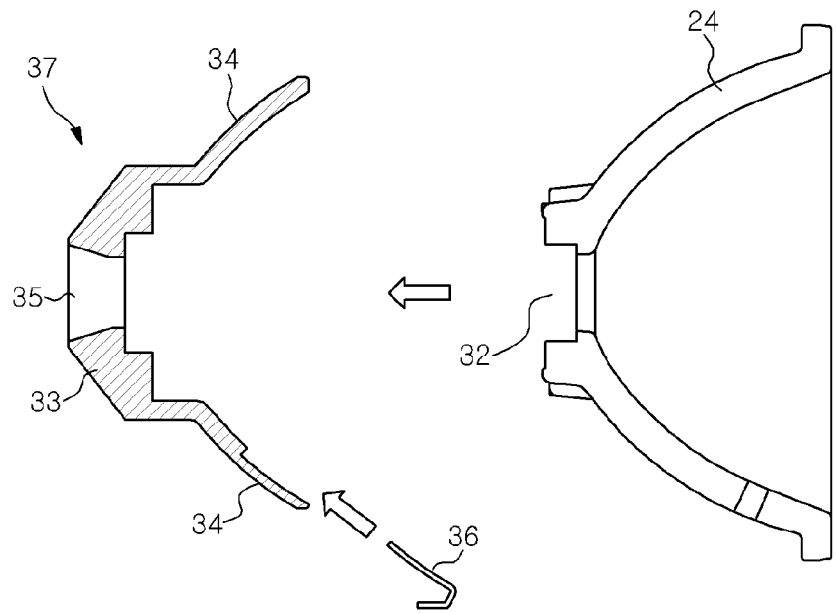
FIGS. 2A to 2D are schematic sectional views for explaining a configuration example of the light source unit.
Figure 2B:
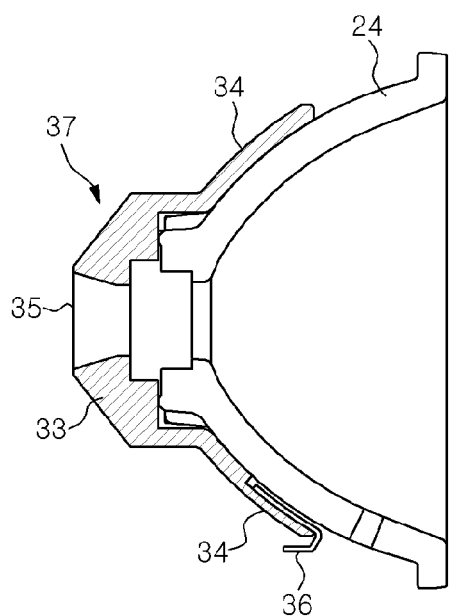

When assembling the light source unit 3, the reflection mirror 24 and the restraint member 36 are first attached to a member (hereinafter referred to as a "reinforcing base member 37") obtained by forming the reinforcing member 34 and the base 33 as one unit, as shown in FIGS. 2A and 2B. The reinforcing base member 37 and the reflection mirror 24 are joined together by an adhesive agent such as cement or the like. A portion of the restraint member 36 is inserted between, and bonded to, the rear surface of the reflection mirror 24 and the reinforcing member 34.

Figure 2C:
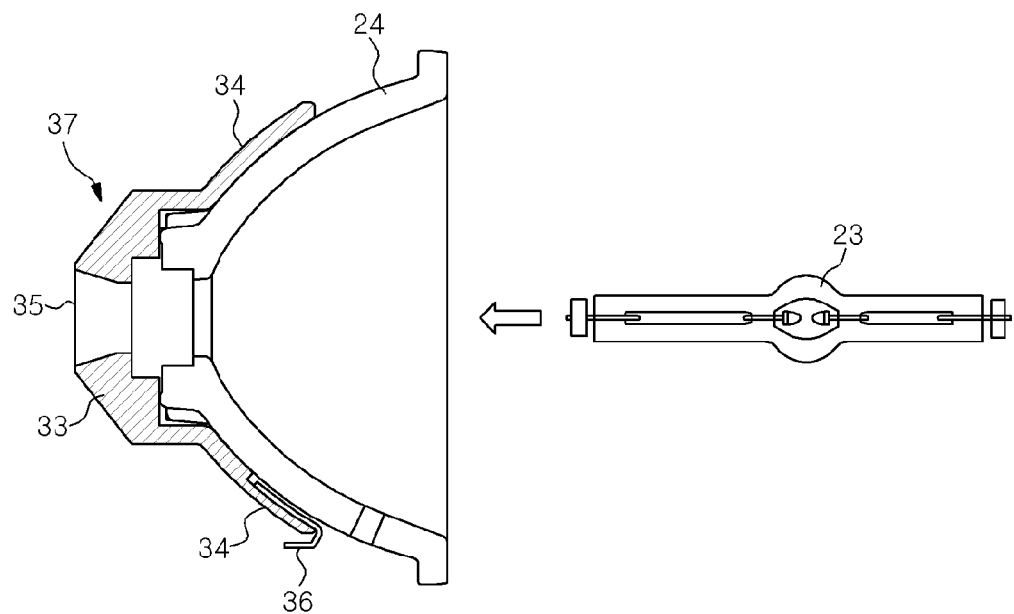
Figure 2D:
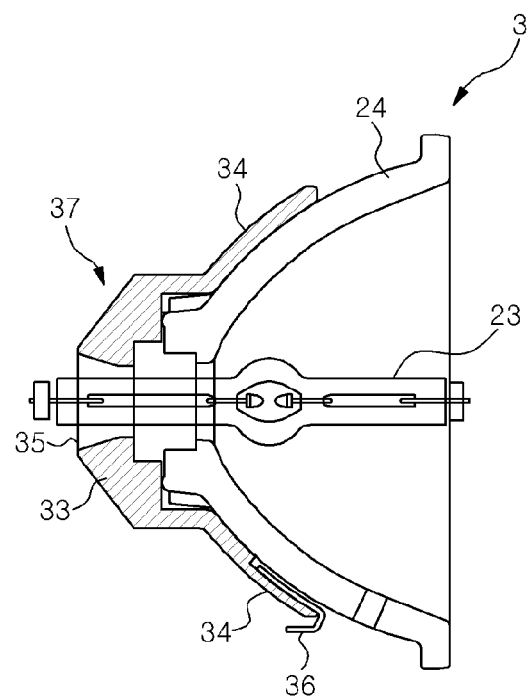

Next, as shown in FIGS. 2C and 2D, one end of the lamp 23 is inserted into the opening 35 of the base 33 at the front surface side. The lamp 23 and the base 33 are bonded to each other in a state where the lamp 23 partially protrudes rearward. In this bonding, it is possible to use an adhesive agent such as cement or the like. Thus, the lamp 23 is fixed to the base 33.

Alternatively, prior to fixing the reinforcing base member 37 to the rear surface of the reflection mirror 24, one end of the lamp 23 may be inserted into the opening 35 of the reinforcing base member 37 (the base 33) at the front surface side. Then, the reinforcing base member 37 and the lamp 23 may be bonded to each other in a state where the lamp 23 partially protrudes rearward. The reflection mirror 24 and the restraint member 36 may be attached to the reinforcing base member 37 and the lamp 23 thus assembled.

The light source unit 3 thus assembled includes the restraint member 36 for restraining the movable range of the second power supply line 27. Therefore, even if an external force is applied to the second power supply line 27, the unnecessary force applied to the external electrode 63 of the front end of the lamp 23 is reduced. Thus, it is possible to obtain an effect of preventing the position shift and breakage of the lamp 23.

Further, it is not always necessary for the reflection mirror 24 to have the through-hole 65 to connect the second power supply line 27 to the external electrode 63 of the lamp 23. The second power supply line 27 may be connected to the external electrode 63 of the lamp 23 by allowing the second power supply line 27 to go around the frontal outer edge of the reflection mirror 24.

A specific embodiment of the present disclosure will now be described.

Embodiment

1. Projector

Figure 3A:
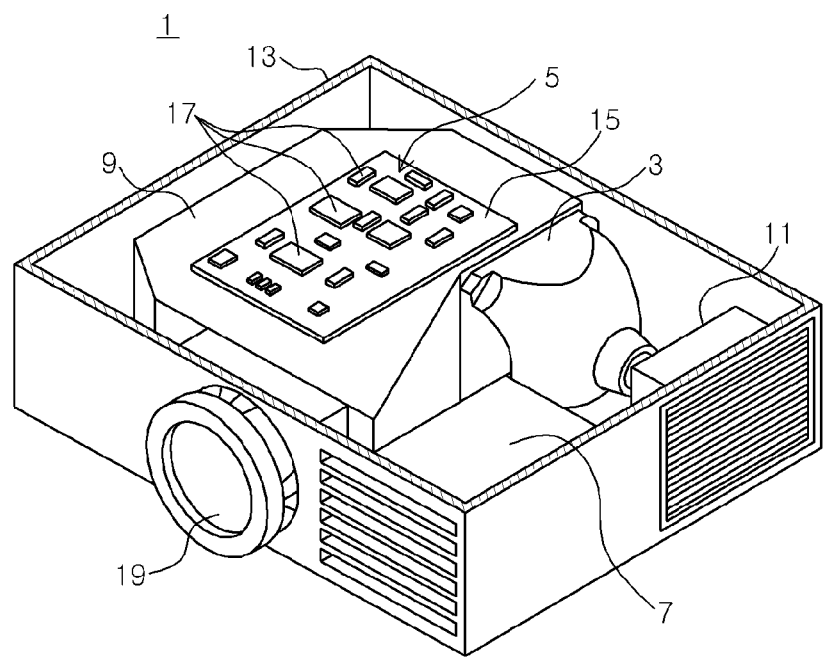
FIG. 3A is a perspective view showing a configuration example of a projector in accordance with the embodiment of the present disclosure.

FIG. 3A is a perspective view showing a portion of the internal structure of a projector 1 according to an embodiment of the present disclosure.

The projector 1, which is a front-projection-type liquid crystal projector, includes the light source unit 3 having a high-pressure discharge lamp disposed therein, a power supply unit 5 having an electronic ballast for turning on a lamp, a control unit 7, a lens unit 9 having a condensing lens, a transmission-type color liquid crystal display panel and a drive motor installed therein, a cooling fan unit 11, and a case 13 for accommodating the units 3, 5, 7, 9 and 11. The lens unit 9 includes the lens 19, the transmission-type color liquid crystal display panel and the drive motor installed therein. The lens 19 is disposed so as to protrude toward the outside of the case 13.

The power supply unit 5 converts, e.g., a household AC voltage of 100 to 120 V, to a specified DC voltage and supplies the DC voltage to the electronic ballast, the control unit 7 and so forth. The power supply unit 5 includes a circuit board 15 disposed above the lens unit 9 and a plurality of electronic/electric parts 17 mounted to the circuit board 15.

In response to an image signal inputted from the outside, the control unit 7 drives the color liquid crystal display panel so as to display a color image. Furthermore, the control unit 7 controls the drive motor disposed in the lens unit 9 to execute a focusing operation and a zooming operation.

The light emitted from the light source unit 3 is condensed by the condensing lens arranged in the lens unit 9 and is transmitted through the color liquid crystal display panel disposed in an optical path. Thus, the image formed on the color liquid crystal display panel is projected on a screen (not shown) through an optical system such as the lens 19 and the like.

The projector of the present disclosure is not limited to the front-projection-type projector shown in FIG. 3A but may be a projector of other type. For example, the projector of the present disclosure may be a rear-projection-type projector shown in FIG. 3B.

Figure 3B:
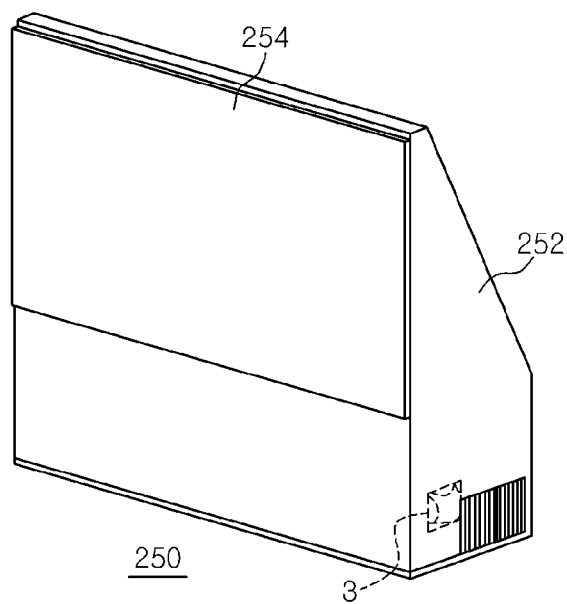
FIG. 3B is a perspective view showing one example of a rear-projection-type projector.

FIG. 3B is a perspective view showing one example of a rear-projection-type projector 250. The projector 250 includes an image displaying screen 254 disposed in the front wall of a cabinet 252. Parts such as the light source unit 3 and the like are mounted within the cabinet 252. By virtue of the light emitted from the light source unit 3, an image is projected on the screen 254 from the rear surface side.

In the present embodiment, the lens unit 9, which modulates the light emitted from the light source unit 3 to form an image to be displayed, includes the liquid crystal display panel disposed on an optical path. However, the configuration of the lens unit 9 is not limited to this example. The image to be displayed may be formed by a processing apparatus including a digital mirror device.

2. Light Source Unit (1) Overall Configuration of Light Source Unit

Figure 4A:
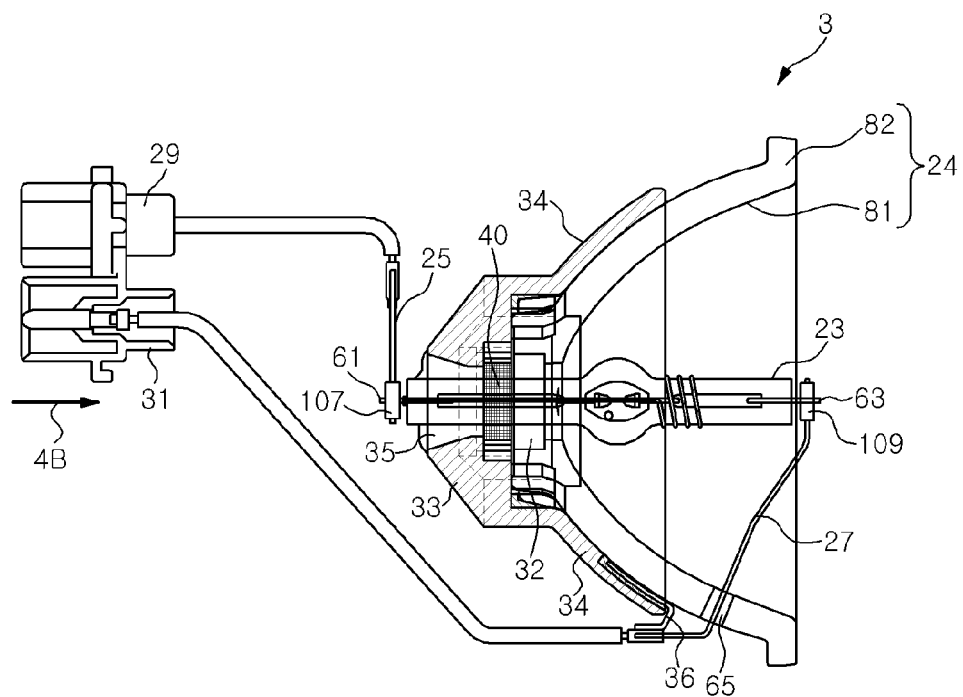
FIG. 4A is a sectional view showing the light source unit in accordance with the embodiment of the present disclosure.
Figure 4B:
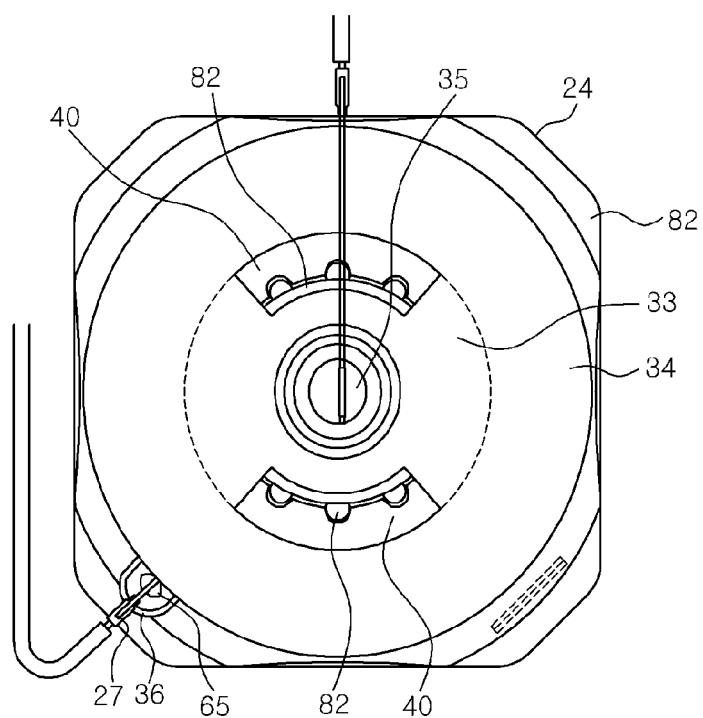
FIG. 4B is an outward appearance view of the light source unit shown in FIG. 4A, which is seen from the rear surface side (in the direction indicated by an arrow 4B of FIG. 4A).

FIG. 4A is a sectional view showing the light source unit 3 according to the present embodiment. FIG. 4B is an outward appearance view of the light source unit 3 shown in FIG. 4A, which is seen from the rear surface side (in the direction indicated by an arrow 4B of FIG. 4A). In FIGS. 4A and 4B, the elements corresponding to those shown in FIGS. 1A and 1B are designated by like reference symbols.

The light source unit 3 includes a high-pressure discharge lamp 23 having the first external electrode 61 and the second external electrode 63 disposed at the opposite ends thereof, and the concave reflection mirror 24 configured to reflect the light emitted from the lamp 23.

The light source unit 3 is connected to the power supply unit 5 (see FIG. 3A) through a pair of power supply lines (lead wires) 25 and 27 having one ends respectively connected to the external electrodes 61 and 63 of the opposite ends of the lamp 23 and through a pair of connectors 29 and 31 respectively connected to the other ends of the power supply lines 25 and 27.

Each of the power supply lines 25 and 27 includes a portion formed of an electrically conductive core coated with an insulating cover material (a portion disposed at the side of the connector 29 or 31), and a portion formed of an electrically conductive wire, such as a nickel wire or the like, connected to the external electrode 61 or 63. The power supply lines 25 and 27 are connected to the first and the second external electrode 61 and 63 through connection sleeves 107 and 109.

The reflection mirror 24 includes the base material 82 having a concave surface shape, and a reflection surface 81 formed on the base material 82 at the front surface side of the reflection mirror 24. The reflection mirror 24 further includes an opening 32, which is formed at the center thereof and is configured to accommodate one end of the lamp 23; and a through-hole 65, which is formed in a part of the side surface of the reflection mirror 24 and is configured to allow the second power supply line 27 to extend therethrough.

In FIG. 4A, for the sake of convenience in description, the connection sleeve 109, the power supply line 27 and the through-hole 65 are shown as if they exist on one plane. However, the light source unit according to the present disclosure also includes a configuration in which the connection sleeve 109, the power supply line 27 and the through-hole 65 do not exist on one plane.

The light source unit 3 further includes the base 33 configured to hold one end of the lamp 23, the reinforcing member 34 configured to cover a part of the rear surface of the reflection mirror 24, and a restraint member 36 held between the rear surface of the reflection mirror 24 and the reinforcing member 34. The base 33 has a tubular structure and includes an opening 35 through which one end of the lamp 23 extends such that the first power supply line 25 can be connected to the first external electrode 61, and a pair of ventilating holes 40. The ventilating holes 40 are formed at two locations in order to ventilate the air blown from the cooling fan unit 11 (see FIG. 3A) that cools the lamp 23 and the internal space of the reflection mirror 24 which become hot during the operation of the lamp 23. In order to suppress entry of dust or the like from the outside, the ventilating holes 40 may be covered with a member having a plurality of holes (e.g., a metal mesh) which is capable of allowing an air to flow therethrough.

In the present embodiment, the base 33 is made of steatite ($MgO.SiO_2$). The material of the base 33 is not limited to the steatite and may be an inorganic material having an electric insulation property. For example, the base 33 may be made of an arbitrary ceramic material selected from a group consisting of alumina ($Al_2O_3$), zircon cordierite (MgO—$ZrSiO_4$), silicon carbide (SiC) and silicon nitride ($Si_3N_4$).

In the present embodiment, the reinforcing member 34 is connected to the base 33 and is formed so as to cover the rear surface of the reflection mirror 24. In the present embodiment, the reinforcing member 34 and the base 33 are made of the same material and are formed as one unit. Alternatively, the reinforcing member 34 and the base 33 may be made of different materials and may be separated from each other. The reinforcing member 34 can be made of an arbitrary ceramic material selected from a group consisting of steatite, alumina ($Al_2O_3$), zircon cordierite (MgO—$ZrSiO_4$), silicon carbide (SiC) and silicon nitride ($Si_3N_4$). However, the reinforcing member 34 does not require an electric insulation property and may be formed of, e.g., glass fibers or a metal mesh.

As shown in FIG. 4B, the reinforcing member 34 is bonded to the reflection mirror 24 so as to, when seen from the rear surface side of the reflection mirror 24 (i.e., when seen from one end of the lamp 23 passing through the opening 32), surround the periphery of the base 33 in a band-shape. The restraint member 36 is fixed, by welding, to the part of the second power supply line 27 led out from the rear surface of the reflection mirror 24 through the through-hole 65.

(2) Configuration of Reflection Mirror

Figure 5A:
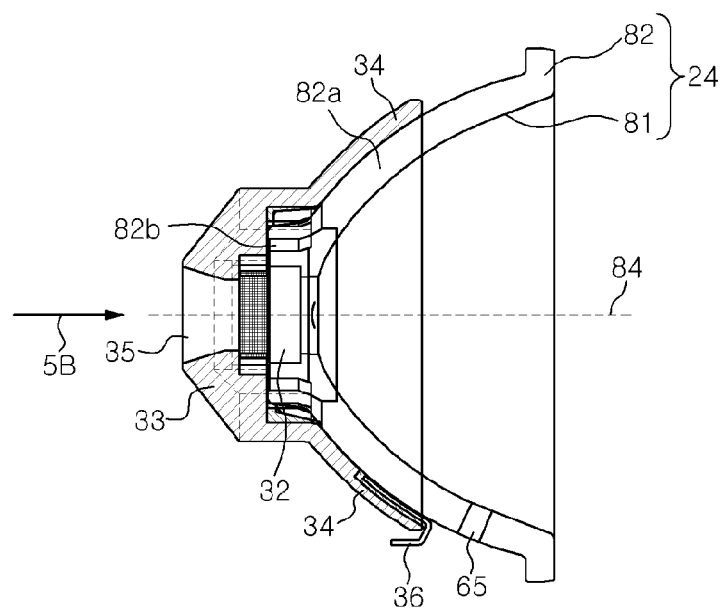
FIG. 5A is another sectional view showing the light source unit.
Figure 5B:
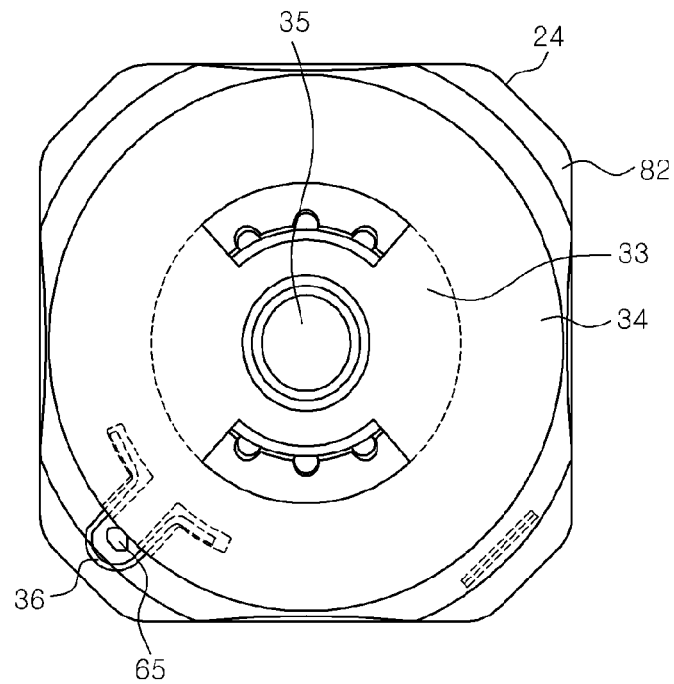
FIG. 5B is an outward appearance view of the light source unit shown in FIG. 5A, which is seen from the rear surface side (in the direction indicated by an arrow 5B of FIG. 5A).

FIG. 5A is a view showing a cross section obtained by imaginarily cutting the part of the light source unit 3 other than the lamp 23 along a plane including the center axis 84 of the reflection mirror 24. FIG. 5B is an outward appearance view of the light source unit 3 shown in FIG. 5A, which is seen from the rear surface side (in the direction indicated by an arrow 5B of FIG. 5A).

As shown in FIG. 5A, the reflection mirror 24 includes a glass-made base material 82 and a reflection surface (reflection layer) 81 coated on the surface of the base material 82. The base material 82 includes an outer peripheral portion 82a having a concave surface shape, and a tubular inner peripheral portion 82b having an opening 32 for holding the lamp 23. As shown in FIG. 5B, when seen from the rear surface side (i.e., when seen from one end of the lamp 23 passing through the opening 32), the base material 82 of the reflection mirror 24 has a substantially square shape in which four corner portions not constituting the reflection surface are smoothly rounded. When the reflection mirror 24 is seen from the rear surface side, the length of one side of the reflection mirror 24 may be set e.g., in a range from about 3 cm to 10 cm. In the present embodiment, the length of one side of the reflection mirror is set to 6 cm. By employing such a shape, a light source having a large luminous flux can be efficiently accommodated within a limited space. This makes it possible to increase the degree of freedom of light source arrangement in the projector 1.

As the shape of the reflection surface 81 on the cross section including the center axis 84 of the reflection mirror 24, it is possible to select a short-focus-type elliptical shape or a parabolic shape. In case where a concave lens is used in combination with the light source unit 3, it may be possible to select a long-focus-type elliptical shape. The reflection surface 81 may be formed of a reflection layer made of a dielectric multi-layer film and may be configured to selectively reflect visible light and to transmit ultraviolet rays and infrared rays. The reflection mirror 24 is, e.g., a dichroic reflection mirror. The light source unit according to the present disclosure can be used as a light source for a device (e.g., an exposure device) other than the projector. In that case, electromagnetic waves rather than visible light are emitted from the lamp. The dielectric multi-layer film of the reflection surface 81 can be appropriately designed depending on the wavelength of the radiations (electromagnetic waves) used.

In the present embodiment, the reflection mirror 24 can be made of aluminosilicate glass or borosilicate glass. The strength of these glass materials is lower than that of crystallized glass. However, these glass materials have an advantage in that they are relatively cheap in price.

The crystallized glass is amorphous glass in which fine crystals are generated by ultraviolet irradiation or heat treatment. The crystallized glass is a collection of crystal grains. The crystallized glass is superior in strength and heat resistance. Since the crystallized glass is crystalline, the thermal expansion coefficient of the crystallized glass is lower than that of amorphous glass. However, the crystallized glass is relatively expansive, which is a main factor in increasing the manufacturing cost.

In contrast, the borosilicate glass is ordinary glass. The borosilicate glass is relatively low in strength but is cheap in price. The aluminosilicate glass is glass mainly composed of aluminosilicate. The aluminosilicate glass, which rarely contains alkali, is superior in chemical durability, heat resistance, strength and rigidity. The aluminosilicate glass is more expansive than the borosilicate glass but is cheaper than the crystallized glass.

The reflection efficiency of the reflection mirror 24 becomes higher as the position of the through-hole 65 of the reflection mirror 24 is closer to the front end of the reflection surface 81. For that reason, in the present embodiment, the through-hole 65 is provided in a position closer to the front end of the reflection surface 81. The size of the through-hole 65 is determined depending on the thickness of the second power supply line 27. The through-hole 65 may be, e.g., a circular hole having a diameter in a range from 3 mm to 8 mm.

(3) Configuration of Restraint Member

The restraint member 36 can be made of, e.g., at least one material selected from a group consisting of nickel (Ni), nickel alloy (Ni alloy), iron (Fe), iron alloy (Fe alloy), stainless steel, molybdenum (Mo), tungsten (W) and phosphor bronze. When the restraint member 36 is made of the same material as the material of the second power supply line 27, the restraint member 36 and the second power supply line 27 can be easily fixed to each other by welding. As long as a portion of the restraint member 36 is formed of a material to which the second power supply line 27 can be easily welded, the remaining portion of the restraint member 36 may be made of a material to which the second power supply line is difficult to be welded. That is to say, the restraint member 36 as a whole needs not be made of the same material.

In the present embodiment, at least a portion of the restraint member 36 has a shape which can be held between the reinforcing member 34 and the reflection mirror 24. Grooves or recess portions for receiving the portion (e.g., at least a part of the first line-shaped portion 36a) of the restraint member 36 may be formed in the part of the surface of the reinforcing member 34 facing the rear surface of the reflection mirror 24.

When the reinforcing member 34 and the reflection mirror 24 are bonded to each other by an adhesive agent such as cement or the like, the portion of the restraint member 36 is fixed in the gap between the reinforcing member 34 and the reflection mirror 24. The cement may be formed by at least one of material arbitrarily selected from a group consisting of silica ($SiO_2$)-based cement, alumina ($Al_2O_3$)-based cement and zirconia ($ZrO_2$)-based cement. In the present embodiment, cement obtained by mixing silica and alumina is used. Prior to being cured, the cement is in the form of paste which contains a solvent and a binder. When baked, the majority of these components is vaporized and the cement is cured.

As mentioned above, the function required in the restraint member 36 is to sufficiently suppress the application of an external force to the second external electrode 63 through the second power supply line 27 when or after the second power supply line 27 is connected to the second external electrode 63, thereby preventing the position shift and breakage of the lamp 23. For that reason, at least a portion of the restraint member 36 needs to be fixed to the reflection mirror 24. It is preferred that the position of the portion (hereinafter often simply referred to as a "connection portion") where the restraint member 36 and the second power supply line 27 are brought into contact with each other or fixed to each other is substantially fixed with respect to the reflection mirror 24. More specifically, even if the maximum external force assumed to act in an ordinary case is applied to the second power supply line 27, the moving distance of the "connection portion" can be reduced to, e.g., about 2 to 5 mm or less, by the rigidity and elasticity of the restraint member 36.

Figure 16A:
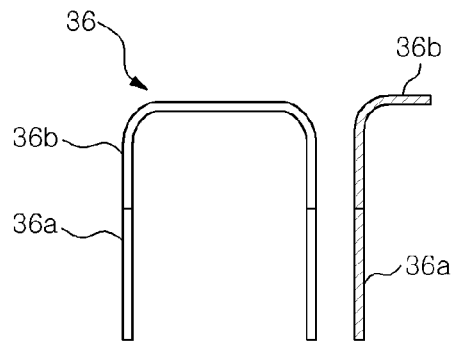
FIGS. 16A to 16C show modified examples of the shape of the restraint member in accordance with the embodiment of the present disclosure.

The structure and function of the restraint member 36 will now be described in detail with reference to FIGS. 6 and 16A.

Figure 6:
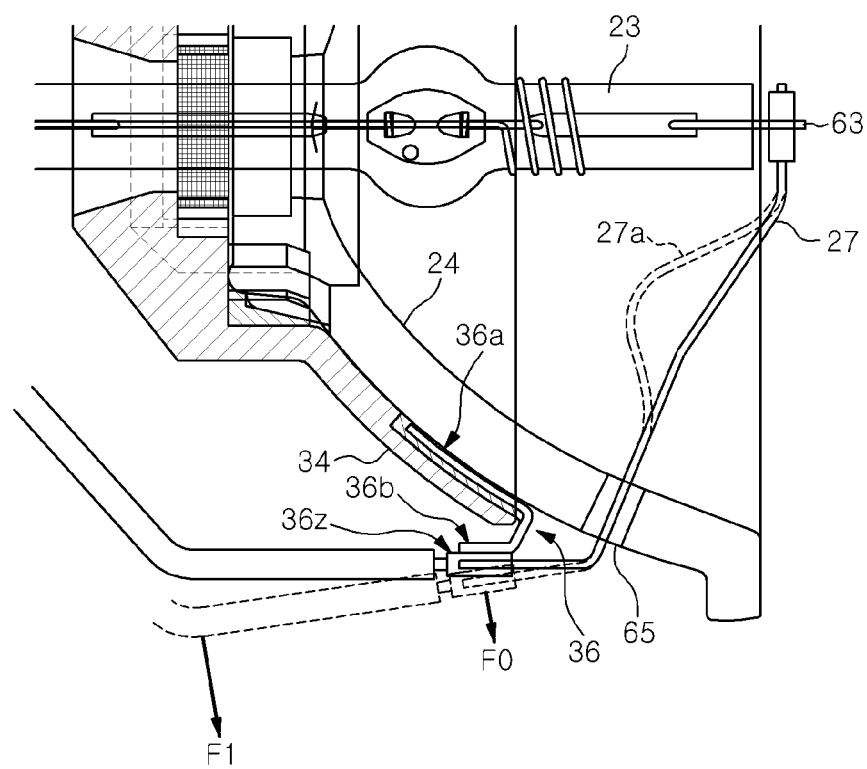
FIG. 6 is an enlarged sectional view showing a part of the light source unit.

The restraint member 36 shown in FIG. 6 includes a first line-shaped portions 36a fixed between the rear surface of the reflection mirror 24 and the reinforcing member 34, and a second line-shaped portion 36b fixed to the second power supply line 27. In this example, as shown at the left side in FIG. 16A, the restraint member 36 is formed of a single electrically conductive line obtained by interconnecting the first line-shaped portions 36a and the second line-shaped portion 36b. At the right side in FIG. 16A, there is shown the shape of the restraint member 36 which is seen from one lateral side in FIG. 16A. The length of the single electrically conductive line forming the restraint member 36 may be, e.g., in a range from about 0.5 cm to 5 cm.

As shown in FIG. 6, due to the rigidity and elasticity of the restraint member 36, the position of the connection portion 36z of the restraint member 36 and the second power supply line 27 can be shifted within a limited range under the action of an external force. In the example shown in FIG. 6, if an external force indicated by an arrow F1 is applied to the second power supply line 27, the second power supply line 27 is moved to the position indicated by a dot line. At this time, the movable range of the connection portion 36z is restrained by the restraint member 36. Therefore, the position of the connection portion 36z is shifted by a short distance as indicated by an arrow F0. The movable range of the connection portion 36z can be adjusted depending on the rigidity and elasticity of the restraint member 36 and the shape and size of the restraint member 36.

As indicated by a dot line in FIG. 6, if the second power supply line 27 includes a "curved" portion 27a between the connection portion 36z and the second external electrode 63, the force applied to the second external electrode 63 can be sufficiently reduced even when the connection portion 36z is moved to a relatively large extent. In case where the second power supply line 27 is curved, the movable range of the connection portion 36z may be widened depending on the degree of curvature of the second power supply line 27. However, in order to simplify the structure of the restraint member 36, it is preferred that the restraint member 36 is firmly secured to at least a part of the second power supply line 27, thereby fixing the position of the connection portion 36z.

Figure 16B:
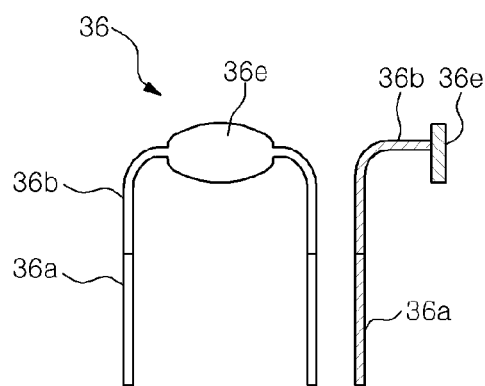

In case where the second power supply line 27 is welded to the restraint member 36, a flat region may be provided in at least a portion of the restraint member 36 such that welding can be performed with ease. For example, as shown in FIG. 16B, a flat portion 36e may be provided in the second line-shaped portion 36b. As long as the flat portion 36e is made of a material that can be welded to the second power supply line 27, the remaining portion of the restraint member 36 may be made of a material different from the material of the flat portion 36e.

The restraint member 36 may be provided around the through-hole 65 of the reflection mirror 24 at the rear surface side of the reflection mirror 24. This is to make sure that the restraint member 36 attached to the rear surface side of the reflection mirror 24 and the second power supply line 27 passing through the through-hole 65 of the reflection mirror 24 can be easily connected to each other. In the present embodiment, a grommet member and a ring-shaped terminal are not provided in the through-hole 65. However, the second power supply line 27 passing through the through-hole 65 is constrained by the inner wall of the through-hole 65 and is restrained from moving in the direction perpendicular to the inner wall. The restraint member 36 has a function absent in the through-hole 65 in that the restraint member 36 restrains the movement of the second power supply line 27 in the direction parallel to the inner wall of the through-hole 65.

Figure 17A:
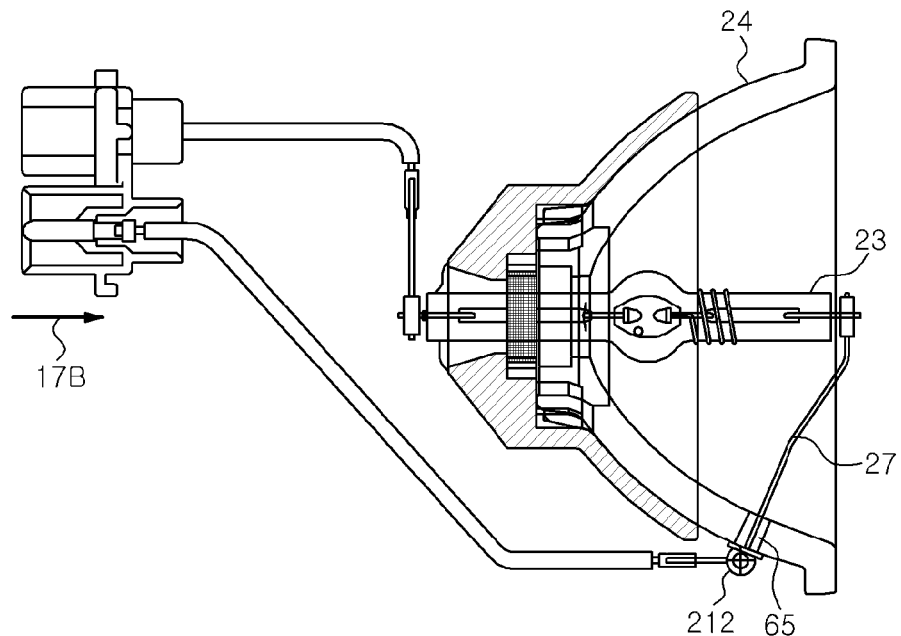
FIG. 17A is a sectional view showing a light source unit having a conventional configuration.
Figure 17B:
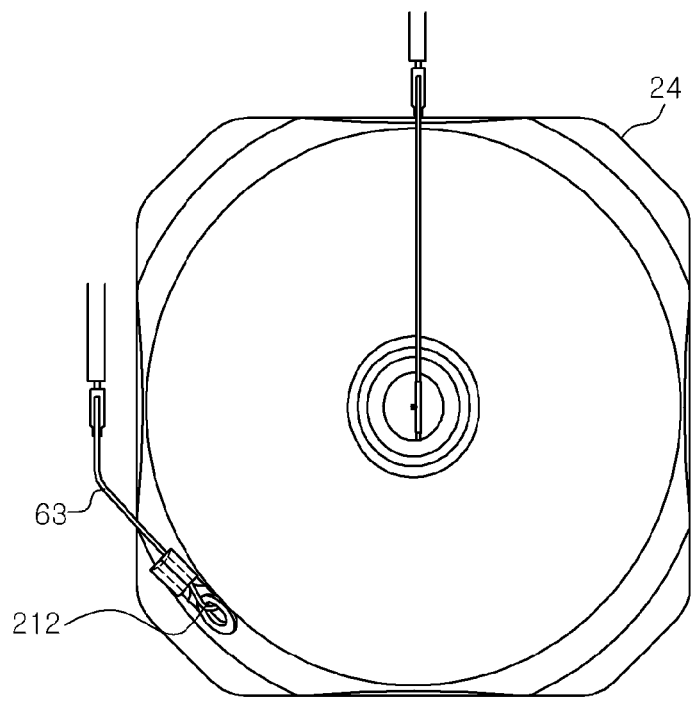
FIG. 17B is an outward appearance view of the light source unit shown in FIG. 17A, which is seen from the rear surface side (in the direction indicated by an arrow 17B of FIG. 17A).

Now, the conventional wiring line restraint structure disclosed in JP2006-172810A and the restraint member 36 according to the present embodiment will be compared with each other. FIG. 17A is a view showing an example of a case where the conventional wiring line restraint structure disclosed in JP2006-172810A is applied to a light source unit. FIG. 17B is an outward appearance view of the light source unit shown in FIG. 17A, which is seen from the rear surface side (in the direction indicated by an arrow 17B of FIG. 17A). According to the conventional case, in order to restrain the movement of the second power supply line 27 in the direction parallel to the inner wall of the through-hole 65, it is necessary to perform a step of inserting a ring-shaped terminal 212 into the through-hole 65 through a grommet member. This poses a problem in that the number of steps becomes larger. However, in the embodiment of the present disclosure, the aforementioned step is unnecessary. In the present embodiment, in order to fix the restraint member 36 to the reflection mirror 24, it is only necessary to insert and fix a portion of the restraint member 36 between the reinforcing member 34 and the reflection mirror 24. This work step is relatively easy to perform.

In the present embodiment, the restraint member 36 is formed by bending one metal wire. The opposite end portions of the metal wire are fixed to the rear surface of the reflection mirror 24 and/or the reinforcing member 34. Therefore, the metal wire is hardly removed. The second line-shaped portion 36b of the restraint member 36, which extends out from the reinforcing member 34 to be exposed, has a roundly curved shape. This reduces the possibility that the second line-shaped portion 36b causes damage to the hands of a worker or other devices existing round the second line-shaped portion 36b.

The restraint member 36 may be configured to realize a function of "electric connection" to form a part of a power supply path, in addition to the function of restraining the movable range of the second power supply line 27. One example of such a configuration will now be described.

Figure 7A:
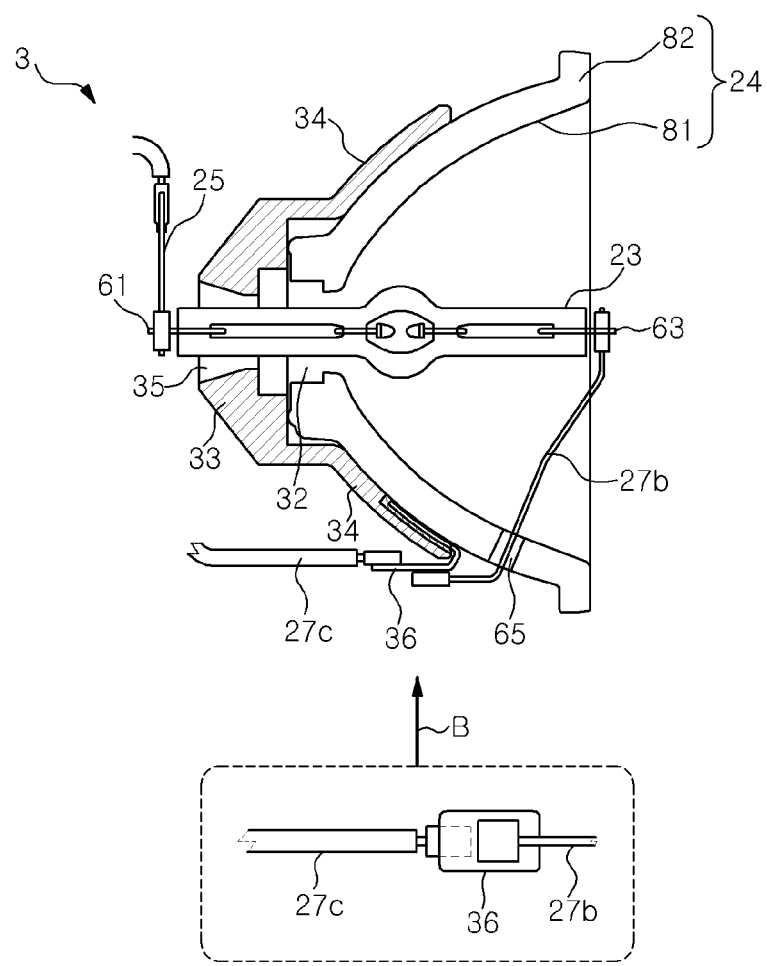
FIG. 7A shows a modified example for connecting a restraint member and a second power supply line in accordance with the embodiment of the present disclosure.

In the example shown in FIG. 7A, the second power supply line 27 is divided into a first portion 27b and a second portion 27c. One restraint member 36 is configured to realize the connection of the first portion 27b and the second portion 27c. In the region surrounded by a broken line in FIG. 7A, there is schematically shown the connection state of the restraint member 36 which is seen in the direction of an arrow B.

In this example, the restraint member 36 is made of an electrically conductive material and is configured to form a part of a power supply path. In this example, the first portion 27b of the second power supply line 27 is welded to a portion of the restraint member 36. The second portion 27c is welded to another portion of the restraint member 36. Thus, electric power is supplied from the second portion 27c to the first portion 27b of the second power supply line 27 through the restraint member 36.

In case where a plurality of restraint members 36 is attached to one reflection mirror 24, the first portion 27b of the second power supply line 27 may be connected to the restraint member 36 in a position close to the through-hole 65, and the second portion 27c of the second power supply line 27 may be connected to the restraint member 36 in a position distant from the through-hole 65. In this case, two restraint members 36 need to be electrically connected to each other. In order to electrically connect the restraint members 36 to each other, for example, a wiring line may be provided between the reflection mirror 24 and the reinforcing member 34. The respective restraint members may be connected to each other by the wiring line. Alternatively, the restraint members 36 may be integrally formed as one unit by a single metallic material.

Figure 7B:
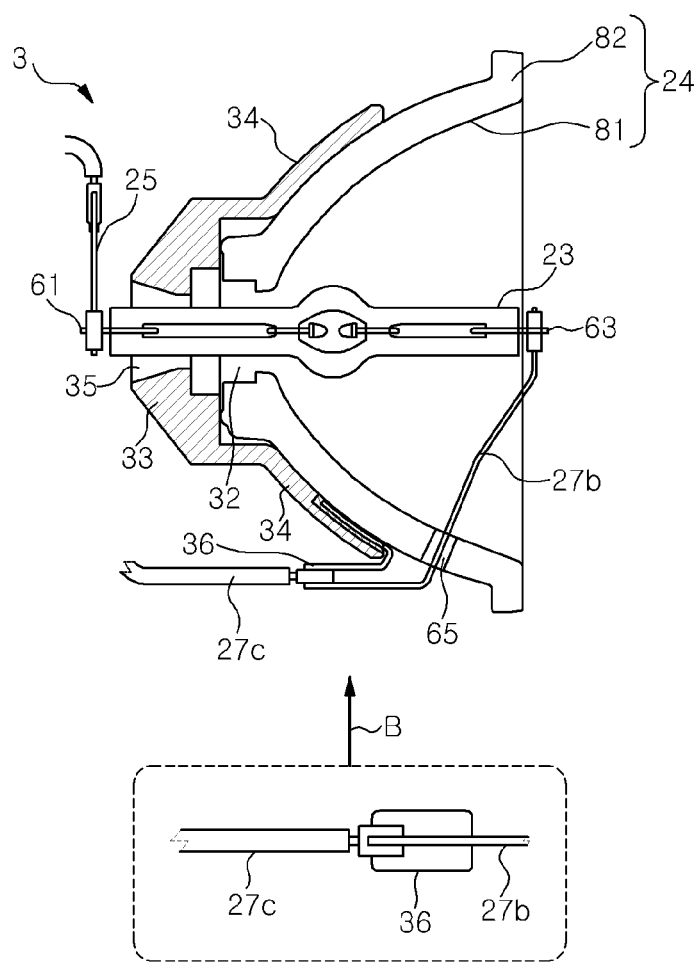
FIG. 7B is a view showing another modified example for connecting the restraint member and the second power supply line in accordance with the embodiment of the present disclosure.

In the example in which the second power supply line is divided into the first portion 27b and the second portion 27c, it may be possible to employ a connection method shown in FIG. 7B. In the region surrounded by a broken line in FIG. 7B, there is schematically shown the connection state of the restraint member 36 which is seen in the direction of an arrow B. In this example, the first portion 27b is electrically connected to the second portion 27c by welding. However, the first portion 27b does not make contact with the restraint member 36. On the other hand, the second portion 27c is fixed to the first portion 27b and the restraint member 36 by welding. Thus, the second portion 27c of this example is welded such that the second portion 27c can be fixed to the restraint member 36 and can make electric contact with the first portion 27b.

(4) Configuration of Reinforcing Member and Base

Figure 8A:
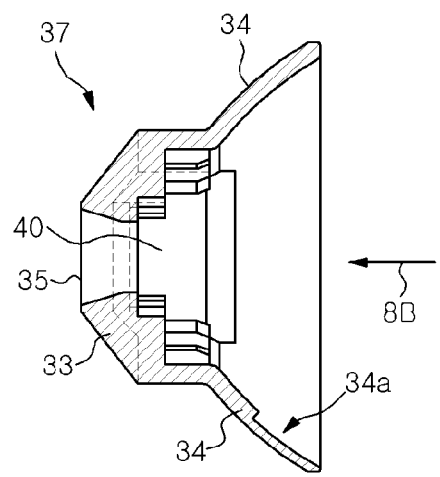
FIG. 8A is a sectional view showing a reinforcing base member in accordance with the embodiment of the present disclosure.
Figure 8B:
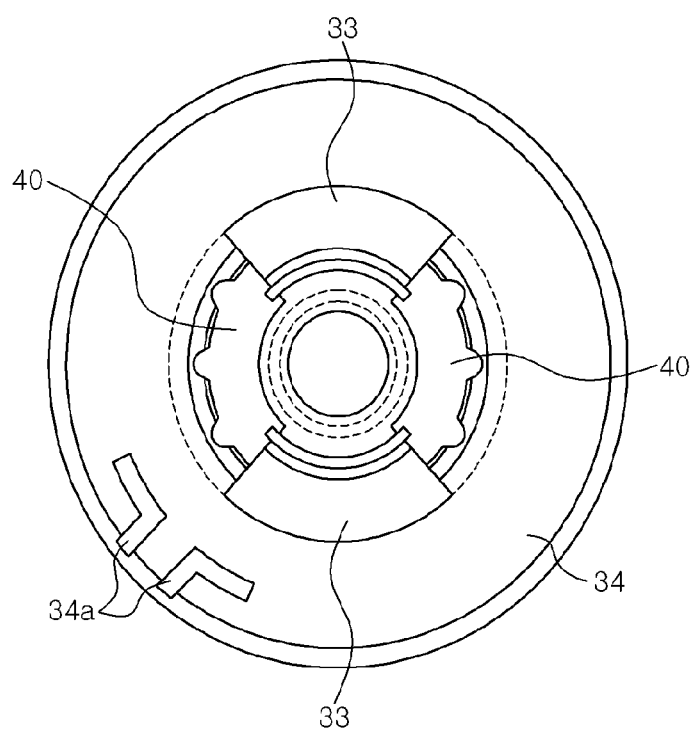
FIG. 8B is an outward appearance view of the reinforcing base member shown in FIG. 8A, which is seen from the front surface side (in the direction indicated by an arrow 8B of FIG. 8A).

FIG. 8A is a sectional view showing the structure of the reinforcing base member 37 which includes the reinforcing member 34 and the base 33. FIG. 8B is an outward appearance view of the reinforcing base member 37 shown in FIG. 8A, which is seen from the front surface side (in the direction indicated by an arrow 8B of FIG. 8A).

As shown in FIGS. 8A and 8B, the reinforcing base member 37 includes two ventilating holes 40 formed in the base 33. This makes it possible to prevent the lamp 23 from becoming hot during the operation thereof. The reinforcing base member 37 includes grooves (recess portions) 34a formed in some parts of the reinforcing member 34, e.g., to accommodate at least a part of the first line-shaped portion 36a of the restraint member 36. The grooves 34a are formed so as to conform to the shape of the restraint member 36. This makes it possible to facilitate the step of fixing the restraint member 36 between the reinforcing member 34 and the concave reflection mirror 24 and to reduce the size of a gap generated by the introduction of the restraint member 36.

As described above, the reflection mirror 24 of the present embodiment can be formed of aluminosilicate glass or borosilicate glass. The thermal expansion coefficient (linear expansion coefficient) of these glass materials ranges from about $3\times10^{-6}/°$ C. to about $4\times10^{-6}/°$ C. In case where the reinforcing member 34 has such a shape as to broadly cover the rear surface of the reflection mirror 24, it is preferred that the reinforcing member 34 is made of a material having a thermal expansion coefficient close to that of the reflection mirror 24. The thermal expansion coefficient of all of the aforementioned materials of the reinforcing member 34 ranges from about $3\times10^{-6}/°$ C. to about $8\times10^{-6}/°$ C. Therefore, the thermal expansion coefficient of the reinforcing member 34 has a value very close to those of aluminosilicate glass and borosilicate glass. That is to say, if the difference between the thermal expansion coefficient of the reflection mirror and the thermal expansion coefficient of the reinforcing member is $8\times10^{-6}/°$ C. or less, it is possible to fabricate the light source unit according to the present disclosure.

The reinforcing member 34 may be made of the same material as the glass material of which the reflection mirror 24 is made. Since the reinforcing member 34 covers at least a part of the rear surface of the reflection mirror 24, it is possible to obtain an effect that the thickness of the reflection mirror 24 effectively increases and the strength thereof becomes higher.

The reinforcing member 34 need not be in the form of a band shape having a uniform width to cover the rear surface of the reflection mirror 24. The reinforcing member 34 may have such a shape that the width thereof is changed periodically or irregularly. The reinforcing member 34 may have a radially extending portion, a slit or an opening. The reinforcing member 34 may cover the substantially entire portion of the rear surface of the reflection mirror 24 or merely a part of the rear surface of the reflection mirror 24. The shape and area of the region covered by the reinforcing member 34 is determined depending on the strength required in the reflection mirror 24. The reinforcing member 34 may cover the substantially entire portion of the rear surface of the reflection mirror 24 and may have an opening for exposing the through-hole 65 of the reflection mirror 24.

Borosilicate glass is cheaper in price but lower in strength (heat resistance) than aluminosilicate glass. For that reason, in case where the reflection mirror 24 is made of borosilicate glass, it is preferred to use the reinforcing member 34, which covers the substantially entire portion of the reflection mirror 24 to thereby realize the light source unit 3, which is low in price and high in strength.

Figure 9:
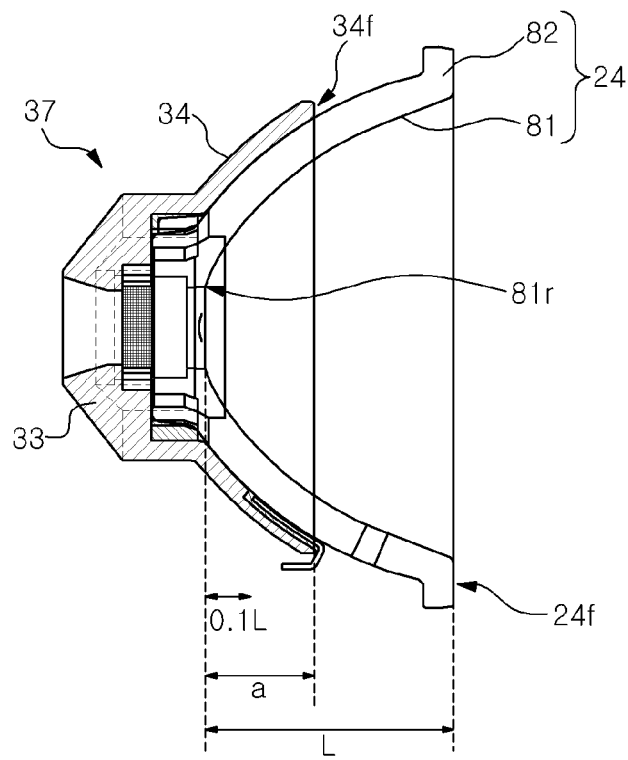
FIG. 9 is a view for explaining an example of the covering range of the reinforcing member covering a concave reflection mirror.

FIG. 9 is a view for explaining an example of the covering range of the reinforcing member 34 covering the concave reflection mirror 24. The reinforcing member 34 can be designed to have a size that satisfies an equation $a>0.1\times L$, where L is the distance from the rear end of the reflection mirror 24 to the front end of the reflection mirror 24 along the center axis 84 (see FIG. 5A) and a is the distance from the rear end of the reflection mirror 24 to the front end of the reinforcing member 34 along the center axis 84. In other words, the reinforcing member 34 extends from the rear end of the reflection mirror 24 toward the front end of the reflection mirror 24 along the rear surface of the reflection mirror 24 such that the reinforcing member 34 covers the rear surface of the reflection mirror 24 by more than $\frac{1}{10}$ of the distance L, in an axial direction of the center axis 84, from the rear end of the reflection mirror 24 to the front end of the reflection mirror 24.

"The rear end of the reflection mirror 24" referred to herein means the innermost portion 81r of the reflection surface 81 of the reflection mirror 24. However, for practical purposes, the portion where the outer surface of the concave reflection mirror 24 is bent or the portion where the curved surface of the reinforcing base member 37 is bent may be regarded as "the rear end of the reflection mirror 24". "The front end of the reflection mirror 24" referred to herein means the outermost portion 24f of the reflection mirror 24 which is positioned at the most front side. "The front end of the reinforcing member 34" referred to herein means the outermost portion 34f of the reinforcing member 34 which is positioned at the most front side.

Accordingly, when the equation $a>0.1\times L$ is satisfied, the reinforcing member 34 has a portion broadened from the rear end of the reflection mirror 24 toward the front end of the reflection mirror 24 beyond a region having a distance of $0.1\times L$. In a certain cases, the reinforcing member 34 may be designed such that the distance a falls in a range from $0.3\times L$ to L. When much more high strength is required, the reinforcing member 34 may be designed such that the distance a falls in a range from 0.5×L to L. The main point is that the reinforcing member 34 of suitable material and size needs to be used depending on the strength of the base material 82 of the reflection mirror 24. In case where much more strong reinforcement is required as in a case where the aforementioned borosilicate glass or a material lower in strength than the borosilicate glass is used as the base material 82, the distance a may be set larger than L.

(5) Configuration of Lamp

Figure 10:
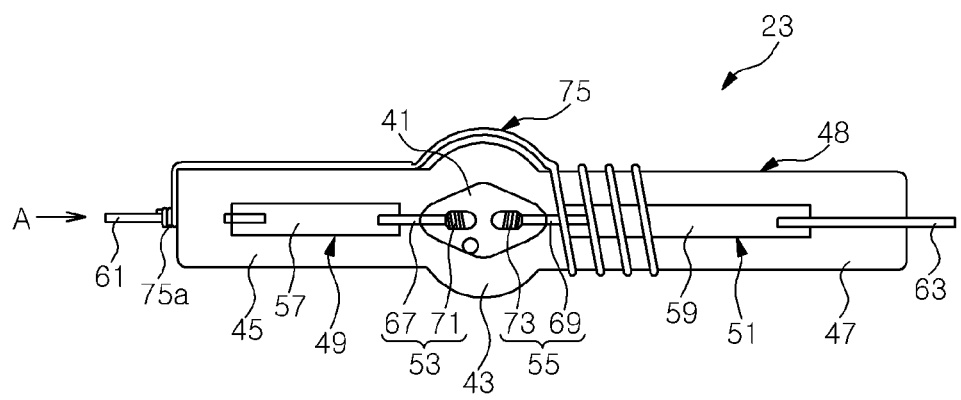
FIG. 10 is a view showing a configuration example of a high-pressure discharge lamp in accordance with the embodiment of the present disclosure.

FIG. 10 is a view showing a configuration example of the lamp 23 according to the present embodiment. The configuration and type of the lamp is not limited in realizing the effects of the embodiment of the present disclosure. Hereinafter, an example of the high-pressure discharge lamp 23 that can be employed in the present embodiment will now be described.

The lamp 23 includes a light emitting unit 43 having an internal discharge space 41, a discharge container 48 having sealing portions 45 and 47 provided at the opposite sides of the light emitting unit 43, and electrode constituting bodies 49 and 51 sealed in the sealing portions 45 and 47 in such a state that the tip portions of the electrode constituting bodies 49 and 51 face each other in the discharge space 41. A predetermined amount of mercury as a light emitting material, a predetermined amount of noble gas for startup aid and a predetermined amount of halogen material for a halogen cycle are enclosed in the discharge space 41.

The electrode constituting bodies 49 and 51 have a structure in which electrodes 53 and 55, metal foils 57 and 59 and external electrodes 61 and 63 are connected to one another (fixed to one another by welding) in that order.

The external electrodes 61 and 63 protrude toward the outside of the discharge container 48 from the opposite end surfaces of the sealing portions 45 and 47 from the light emitting unit 43. The external electrode 63 is connected to the lead wire 27, which is led out toward the outside of the reflection mirror 24 through the through-hole 65 formed in the reflection mirror 24.

The electrodes 53 and 55 are arranged opposite to each other in the discharge space 41 on the substantially same straight line. The lamp 23 is of a so-called short arc type. In order for the lamp 23 to become substantially a point light source, the spacing between the electrodes 53 and 55 can be set to fall e.g., in a range from 0.5 mm to 2.0 mm.

The electrode 53 includes an electrode shaft 67 and an electrode coil 71 provided at the tip of the electrode shaft 67. The electrode 55 includes an electrode shaft 69 and an electrode coil 73 provided at the tip of the electrode shaft 69. The electrode shafts 67 and 69 and the electrode coils 71 and 73 may be formed of different materials or may be formed of the same material.

During a manufacturing process, the electrode constituting bodies 49 and 51 are inserted into a glass tube that forms the discharge container 48. Thereafter, the portions of the glass tube, which will become the sealing portions 45 and 47, are sealed by a well-known shrink sealing method in such a state that the spacing between the electrodes 53 and 55 is set at a predetermined dimension in a space which will become the discharge space 41. Thus, the electrode constituting bodies 49 and 51 are sealed within the sealing portions 45 and 47. As a result, the discharge space 41 is formed in the light emitting unit 43.

A trigger line 75 for lowering a startup voltage when turning on the lamp is wound around the sealing portion 47 at the side of the light emitting unit 43. The trigger line 75 is wound around the sealing portion 47 with a plurality of turns (about four turns in the illustrated example). The trigger line 75 goes over the light emitting unit 43 and extends along the outer surface of the other sealing portion 45. The trigger line 75 is connected to the external electrode 61 protruding from the end surface of the sealing portion 45.

When the lamp 23 is turned on, light is emitted from the substantially central region between the electrodes 53 and 55 toward the reflection surface 81 of the reflection mirror 24. The light thus emitted is reflected by the reflection surface 81 and is emitted forward from the light source unit 3. The light thus emitted is condensed by a condensing lens in the projector 1. Then, the light passes through a color liquid crystal display panel provided on an optical path. Thus, the image formed in the color liquid crystal display panel can be projected on a screen.

3. Modified Examples

Figure 11A:
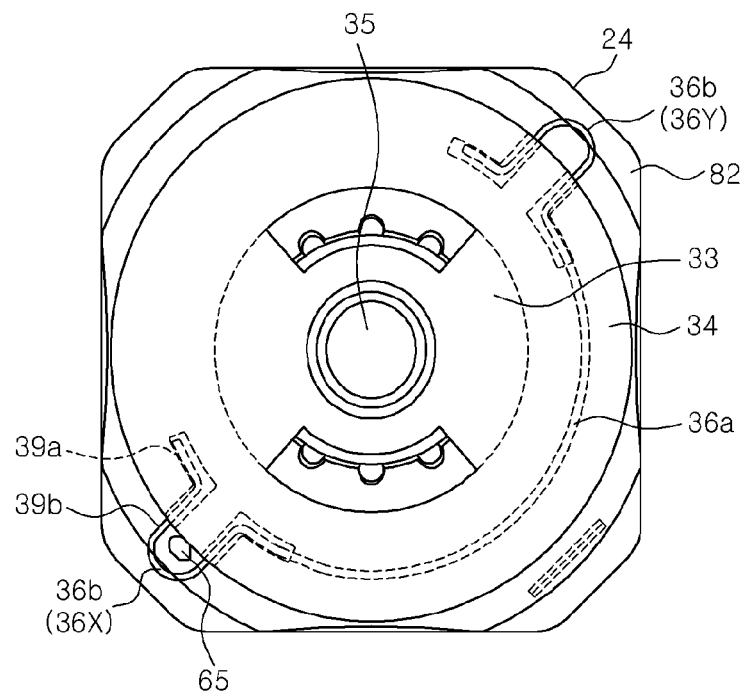
FIGS. 11A to 11C show modified examples of the light source unit in accordance with the embodiment of the present disclosure.
Figure 11B:
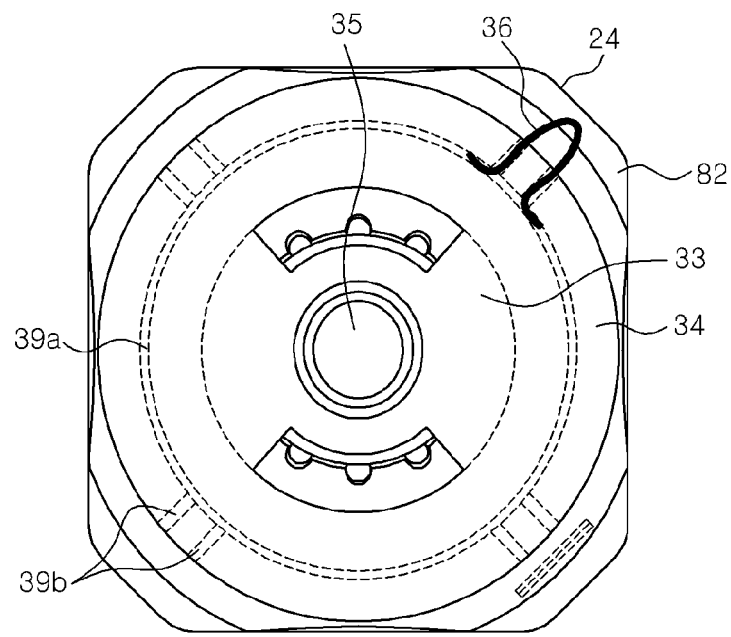
Figure 11C:
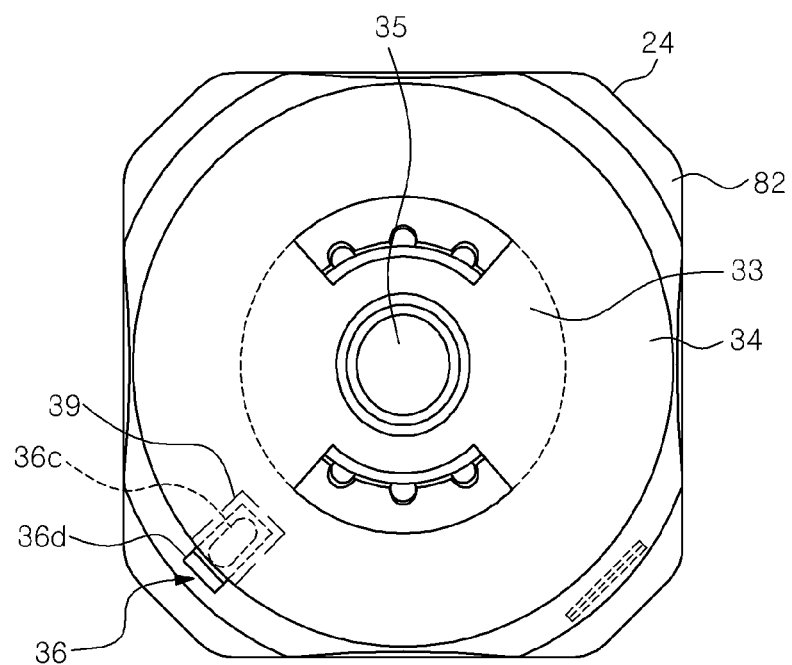

Modified examples of the light source unit 3 according to the embodiment of the present disclosure will be described with reference to FIGS. 11A to 11C. FIGS. 11A to 11C are external appearance views of the light source unit 3 seen from the rear surface side of the reflection mirror 24. For the sake of clarity, the components, which are not required in describing the configuration and arrangement of the restraint member 36, are not shown.

Referring first to FIG. 11A, in the modified example shown in FIG. 11A, the restraint member 36 includes two second line-shaped portions 36b, which are not covered with the reinforcing member 34. The second line-shaped portions 36b are interconnected by a first line-shaped portion 36a, which is covered with the reinforcing member 34. The restraint member 36 is formed by bending a single metal wire. In other words, it can be said that the restraint member 36 has a configuration in which a first restraint member 36X in a position close to the through-hole 65 and a second restraint member 36Y in a position distant from the through-hole 65 are electrically connected to each other by a wiring line (at least a part of the first line-shaped portion 36a). In this modified example, grooves (broken-line portions) for accommodating a portion (e.g., at least a part of the first line-shaped portion 36a) of the restraint member 36 are formed on the surface of the reinforcing member 34 facing the rear surface of the reflection mirror 24. That is to say, the reinforcing member 34 includes a first groove portion 39a provided on at least a part of a circumference surrounding the high-pressure discharge lamp 23 and a second groove portion 39b extending from the first groove portion 39a toward the edge of the reinforcing member 34.

Referring next to FIG. 11B, in the reinforcing member of the modified example shown in FIG. 11B, grooves (broken-line portions) 39a and 39b are formed on the surface of the reinforcing member 34 facing the rear surface of the reflection mirror 24. These grooves are configured to accommodate the restraint member 36 at four positions. That is to say, the reinforcing member 34 includes a first groove portion 39a and four pairs of second groove portions 39b extending from the first groove portion 39a toward the edge of the reinforcing member 34. When attaching the restraint member 36 to the rear surface of the reflection mirror 24, the restraint member 36 is inserted into the grooves of the reinforcing member 34. Thus, the position of the restraint member 36 can be selected from four candidate positions. In general, the restraint member 36 is attached to a position close to the through-hole 65 of the reflection mirror 24. According to this modified example, the degree of freedom in selecting the attachment position of the restraint member 36 is increased. The number of the positions to which the restraint member 36 can be attached is not limited to four but may be any arbitrary number.

Figure 16C:
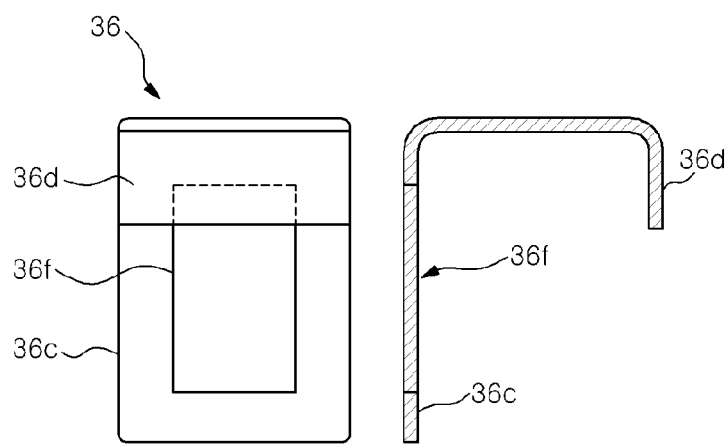

Referring next to FIG. 11C, in the modified example shown in FIG. 11C, the restraint member 36 is formed of a thin metal plate. The restraint member 36 has a structure shown in FIG. 16C. The restraint member 36 includes a first plate-shaped portion 36c positioned in a gap between the rear surface of the reflection mirror 24 and the reinforcing member 34, and a second plate-shaped portion 36d positioned outside of the gap between the rear surface of the reflection mirror 24 and the reinforcing member 34. The second plate-shaped portion 36d is fixed to a second power supply line (not shown in FIG. 11C). In this example, the first plate-shaped portion 36c has an opening 36f for alleviating a stress generated during heat expansion. Alternatively, the opening 36f may not be provided. Further, a recess portion 39 for accommodating the first plate-shaped portion 36c of the restraint member 36 is formed in the reinforcing member 34. The shape and size of the recess portion 39 can be designed so as to conform to the shape and size of the restraint member 36.

Figure 12A:
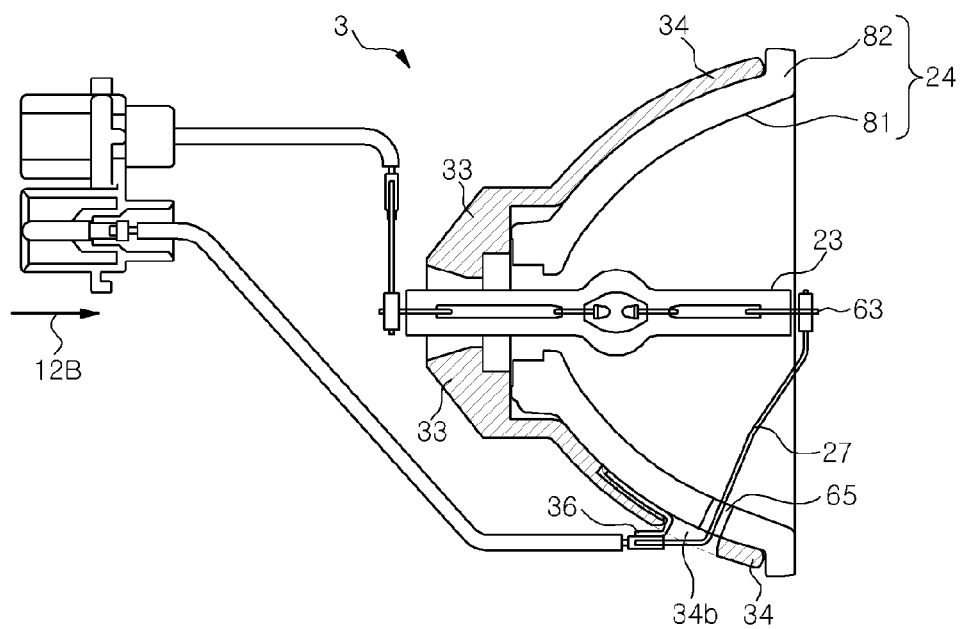
FIG. 12A is a sectional view showing another modified example of the light source unit in accordance with the embodiment of the present disclosure.
Figure 12B:
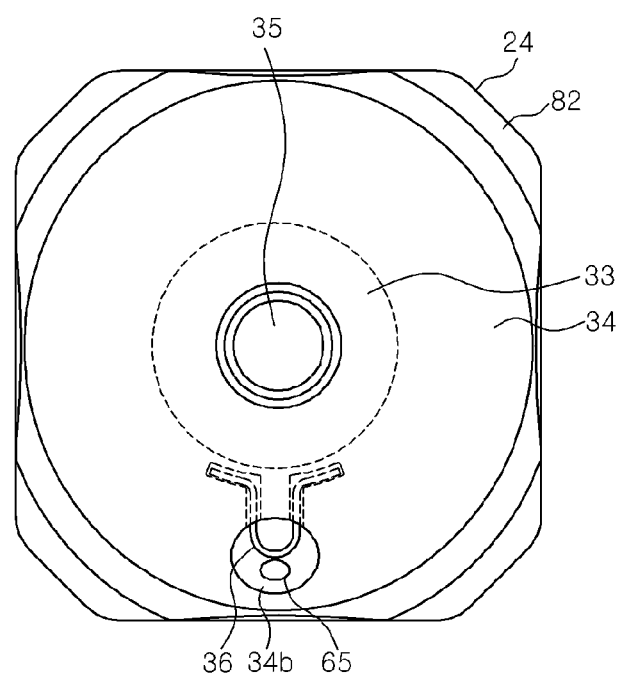
FIG. 12B is an outward appearance view of the light source unit shown in FIG. 12A, which is seen from the rear surface side (in the direction indicated by an arrow 12B of FIG. 11A).

FIG. 12A is a sectional view showing another modified example of the light source unit 3 according to the embodiment of the present disclosure. FIG. 12B is an outward appearance of the light source unit 3 shown in FIG. 12A, which is seen from the rear surface side (in the direction indicated by an arrow 12B of FIG. 12A). In this modified example, the reinforcing member 34 covers the substantially entire portion of the rear surface of the reflection mirror 24. The reinforcing member 34 includes an opening 34b through which the through-hole 65 is exposed. Thus, the second power supply line 27 is connected to the restraint member 36 through the through-hole 65 and the opening 34b.

In this modified example, the opening 34b of the reinforcing member 34 is a hole surrounded by a closed curve. However, the opening 34b of the reinforcing member 34 is not limited to this example. The opening 34b of the reinforcing member 34 may have such a shape that a part of the front end of the reinforcing member 34 is depressed rearward (toward the base 33) so as to expose the through-hole 65.

Figure 13A:
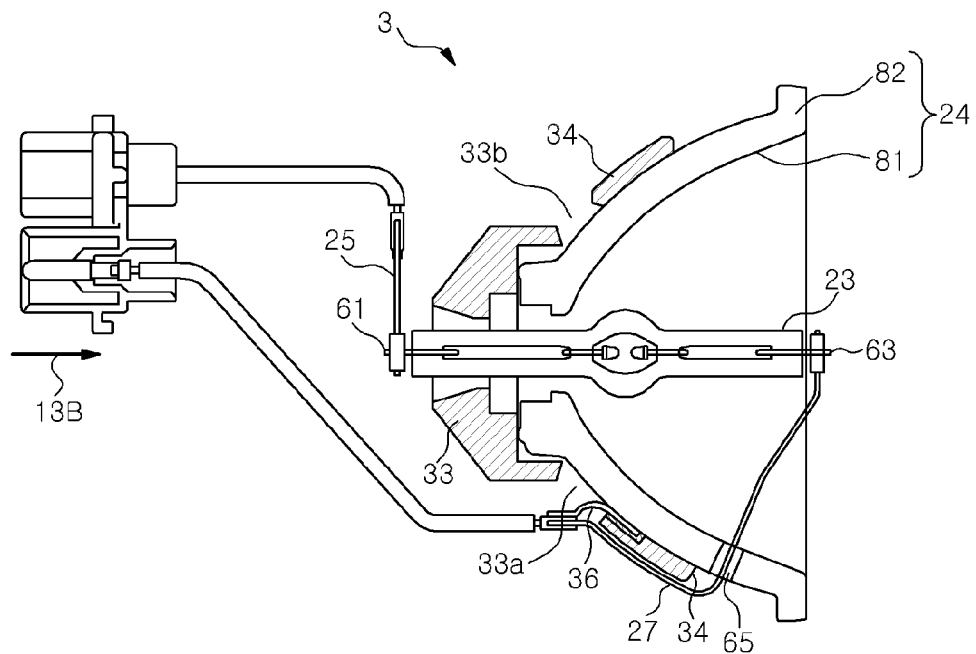
FIG. 13A is a sectional view showing still another modified example of the light source unit in accordance with the embodiment of the present disclosure.
Figure 13B:
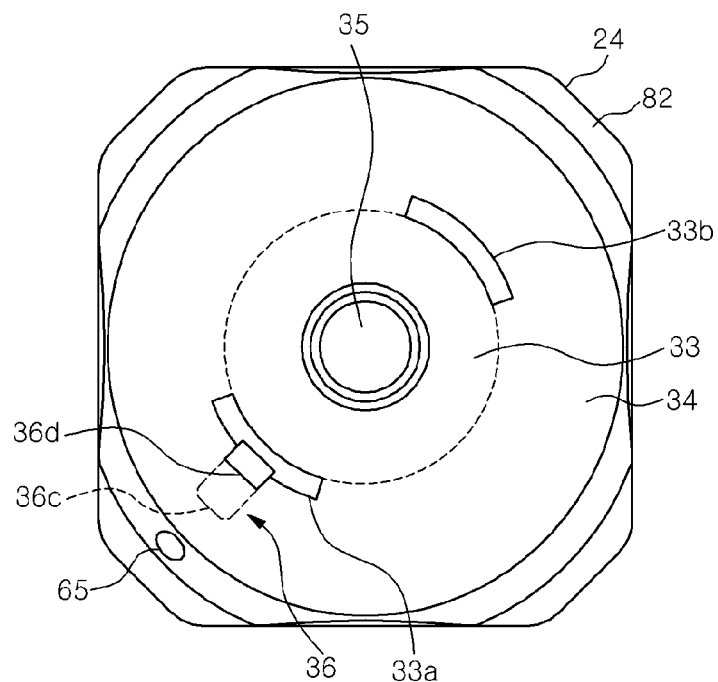
FIG. 13B is an outward appearance view of the light source unit shown in FIG. 13A, which is seen from the rear surface side (in the direction indicated by an arrow 13B of FIG. 13A).

FIG. 13A is a sectional view showing still another modified example of the light source unit 3 according to the embodiment of the present disclosure. FIG. 13B is an outward appearance view of the light source unit 3 shown in FIG. 13A, which is seen from the rear surface side (in the direction indicated by an arrow 13B of FIG. 13A).

In this modified example, slit-shaped openings 33a and 33b are provided between the base 33 and the reinforcing member 34. A portion (second plate-shaped portion 36d) of the flat restraint member 36 is exposed from the opening 33a and is connected to the second power supply line 27. In this modified example, the restraint member 36 has a flat shape. However, the restraint member 36 may have other shapes such as a line shape and the like. Alternatively, the ventilating holes 40 of the aforementioned embodiment may be used as the openings 33a and 33b. Alternatively, it may be possible to employ a configuration in which the restraint member 36 is provided near the through-hole 65 of the reflection mirror 24, the second power supply line 27 is connected to the restraint member 36, an additional restraint member 36 is provided near the opening 33a, and the first power supply line 25 is connected to the additional restraint member 36. According to such a configuration, it is possible to restrain the movement of the first power supply line 25 as well as the movement of the second power supply line 27.

This makes it possible to reduce the force applied to the external electrode 61 connected to the first power supply line 25.

Figure 14A:
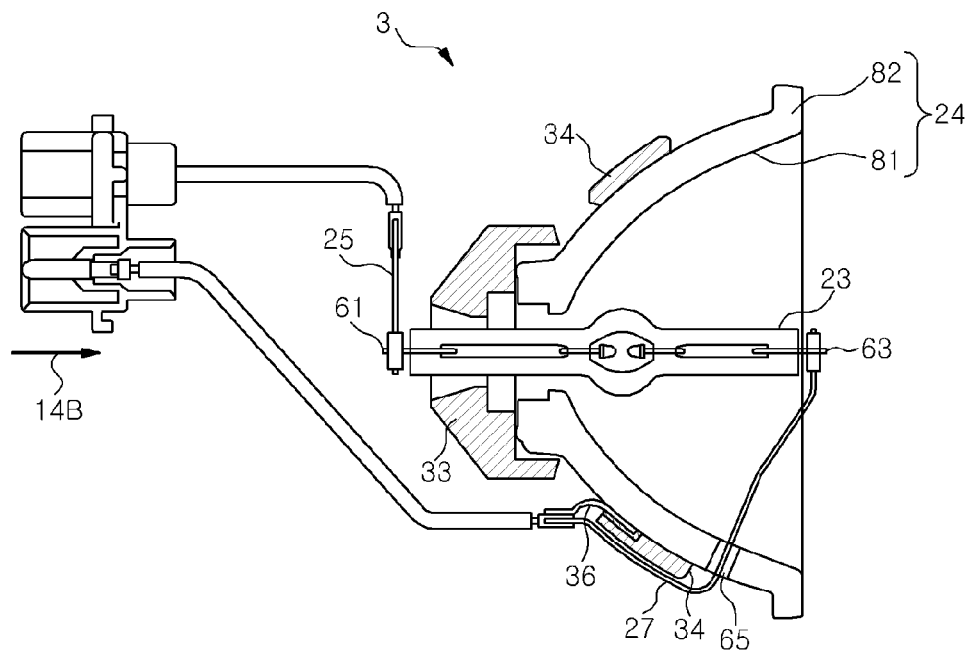
FIG. 14A is a sectional view showing a modified example in which the reinforcing member and the base are separated from each other.
Figure 14B:
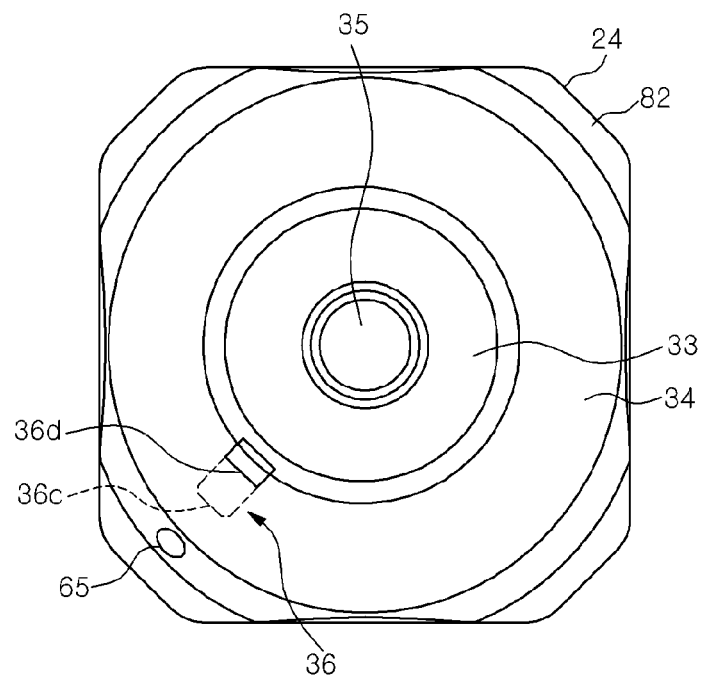
FIG. 14B is an outward appearance view of the light source lamp shown in FIG. 14A, which is seen from the rear surface side (in the direction indicated by an arrow 14B of FIG. 14A).

FIG. 14A is a sectional view showing a modified example in which the reinforcing member 34 and the base 33 are separated from each other. FIG. 14B is an outward appearance view of the light source lamp 3 shown in FIG. 14A, which is seen from the rear surface side (in the direction indicated by an arrow 14B of FIG. 14A). As set forth above, the reinforcing member 34 and the base 33 need not be formed as one unit but may be separated from each other as shown in FIGS. 14A and 14B. Even with this example, it is possible for the base 33 to hold the lamp 23 and to protect the reflection mirror 24. In this example, the restraint member 36 is exposed from the gap between the reinforcing member 34 and the base 33. The second power supply line 27 is fixed to the restraint member 36. However, the present disclosure is not limited to this example. The restraint member 36 may be exposed from the end portion of the reinforcing member 34 distant from the base 33.

Figure 15A:
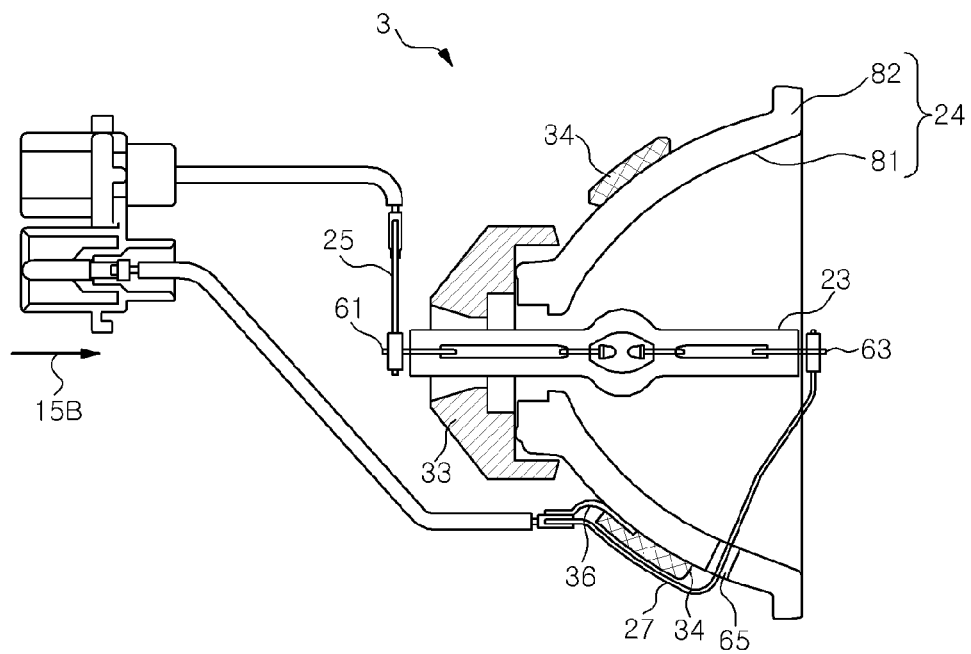
FIG. 15A is a sectional view showing a modified example in which the reinforcing member is formed of a metal mesh.
Figure 15B:
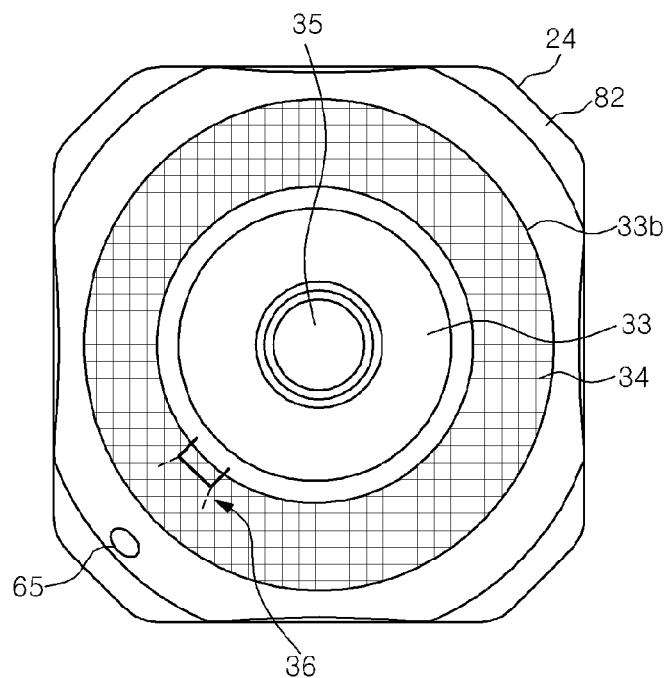
FIG. 15B is an outward appearance view of the light source lamp shown in FIG. 15A, which is seen from the rear surface side (in the direction indicated by an arrow 15B of FIG. 15A).

FIG. 15A is a sectional view showing a modified example in which the reinforcing member 34 is formed of a metal mesh. FIG. 15B is an outward appearance view of the light source lamp 3 shown in FIG. 15A, which is seen from the rear surface side (in the direction indicated by an arrow 15B of FIG. 15A). In this example, the reinforcing member 34 made of a metal mesh is separated from the base 33. In this example, the restraint member 36 shown in FIG. 16A is fixed between the reinforcing member 34 and the rear surface of the reflection mirror 24. The restraint member is exposed from the slit between the base 33 and the reinforcing member 34. The second power supply line 27 is fixed to the restraint member 36. However, the present disclosure is not limited to this example. The restraint member 36 may be exposed from the end portion of the reinforcing member 34 distant from the base 33.

In case where the reinforcing member 34 is formed of a metal mesh, the restraint member 36 may be fixed by inserting the restraint member 36 into the meshes of the metal mesh. In case where a loose strand is generated in the end portion of the metal mesh, the loose strand may be used as the restraint member 36. The second power supply line 27 or the first power supply line 25 may be fixed to the loose strand.

The light source unit of the present disclosure can be suitably used in, e.g., a projector which requires a high-brightness point light source. Such a projector can be extensively used as a display device in, e.g., households, schools, hospitals, companies and resort facilities.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A light source unit comprising:
a high-pressure discharge lamp including a first external electrode and a second external electrode at opposite ends thereof and configured to emit light as electric power is supplied to the first external electrode and the second external electrode through a first power supply line and a second power supply line, respectively;

a concave reflection mirror, which has an opening formed at a center thereof to pass one end of the opposite ends of the high-pressure discharge lamp therethrough and is configured to reflect the light emitted from the high-pressure discharge lamp;

a base configured to hold said one end of the opposite ends of the high-pressure discharge lamp to allow the first power supply line to be connected to the first external electrode;

a reinforcing member covering at least a part of a rear surface of the concave reflection mirror; and a restraint member, which is held between the rear surface of the concave reflection mirror and the reinforcing member to restrain a movable range of the second power supply line, wherein the restraint member makes contact with a part of the second power supply line, and the reinforcing member is bonded to the rear surface of the concave reflection mirror to fix a portion of the restraint member to the rear surface of the concave reflection mirror.

2. The light source unit of claim 1, wherein
the concave reflection mirror includes a through-hole through which to pass the second power supply line, and
the part of the second power supply line is led out from the rear surface of the concave reflection mirror through the through-hole to make contact with the restraint member.

3. The light source unit of claim 1, wherein
the restraint member is made of an electrically conductive material and is fixed to the second power supply line.

4. The light source unit of claim 1, wherein
the reinforcing member is connected to the base.

5. The light source unit of claim 4, wherein
the reinforcing member and the base are made of the same material and are formed as one unit.

6. The light source unit of claim 1, wherein
the reinforcing member extends from a rear end of the concave reflection mirror toward a front end of the concave reflection mirror along the rear surface of the concave reflection mirror such that the reinforcing member covers the rear surface of the concave reflection mirror by more than $1/10$ of a distance, in an axial direction of a center axis of the concave reflection mirror, from the rear end of the concave reflection mirror to the front end of the concave reflection mirror.

7. The light source unit of claim 1, wherein
when the reinforcing member is seen from said one end of the high-pressure discharge lamp, the reinforcing member surrounds a periphery of the base in a band-shape.

8. The light source unit of claim 1, wherein
the concave reflection mirror includes a base material made of amorphous glass and a reflection layer formed on the base material, and the reinforcing member is made of at least one of metal, ceramic, amorphous glass and crystallized glass.

9. The light source unit of claim 1, wherein
the restraint member includes first line-shaped portions positioned in a gap between the rear surface of the concave reflection mirror and the reinforcing member and a second line-shaped portion positioned outside of the gap, and
the second line-shaped portion is fixed to the second power supply line.

10. The light source unit of claim 9, wherein
opposite ends of the second line-shaped portion of the restraint member are respectively connected to the first line-shaped portions.

11. The light source unit of claim 9, wherein
the first line-shaped portions and the second line-shaped portion of the restraint member form a continuous conductive wire.

12. The light source unit of claim 9, wherein
the reinforcing member includes a groove which accommodates at least a part of each of the first line-shaped portions of the restraint member.

13. The light source unit of claim 12, wherein
the groove includes a first groove portion provided on at least a part of a circumference surrounding the high-pressure discharge lamp and a second groove portion extending from the first groove portion toward an edge of the reinforcing member.

14. The light source unit of claim 1, wherein
the restraint member includes a first plate-shaped portion positioned in a gap between the rear surface of the concave reflection mirror and the reinforcing member and a second plate-shaped portion positioned outside of the gap, and
the second plate-shaped portion is fixed to the second power supply line.

15. The light source unit of claim 14, wherein
the first plate-shaped portion of the restraint member has an opening.

16. The light source unit of claim 14, wherein
the reinforcing member has a recess portion for accommodating the first plate-shaped portion of the restraint member.

17. The light source unit of claim 1, wherein
the restraint member is made of at least one material selected from a group consisting of Ni, Ni alloy, Fe, Fe alloy, stainless steel, Mo, W and phosphor bronze.

18. A projector comprising:
the light source unit of claim 1; and
a lens unit configured to modulate the light emitted from the light source unit and to form an image to be displayed.

* * * * *